United States Patent
DeWitt et al.

(10) Patent No.: US 11,643,584 B2
(45) Date of Patent: May 9, 2023

(54) INCORPORATION OF MICROENCAPSULATED PHASE CHANGE MATERIALS INTO WET-SPIN DRY JET POLYMERIC FIBERS

(71) Applicant: Georgia Tech Research Corporation, Atlanta, GA (US)

(72) Inventors: Stephen John Amon DeWitt, Atlanta, GA (US); Ryan P. Lively, Atlanta, GA (US); Héctor Octavio Rubiera Landa, Atlanta, GA (US); Matthew J. Realff, Atlanta, GA (US); Yoshiaki Kawajiri, Nagoya (JP)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 16/764,856

(22) PCT Filed: Aug. 27, 2018

(86) PCT No.: PCT/US2018/048110
§ 371 (c)(1),
(2) Date: May 16, 2020

(87) PCT Pub. No.: WO2019/099086
PCT Pub. Date: May 23, 2019

(65) Prior Publication Data
US 2020/0339857 A1 Oct. 29, 2020

Related U.S. Application Data

(60) Provisional application No. 62/606,148, filed on Nov. 16, 2017.

(51) Int. Cl.
*C09K 5/06* (2006.01)
*D01D 5/06* (2006.01)
(Continued)

(52) U.S. Cl.
CPC .............. *C09K 5/063* (2013.01); *B01J 13/08* (2013.01); *B01J 13/206* (2013.01); *C09K 5/14* (2013.01);
(Continued)

(58) Field of Classification Search
CPC ... C09K 5/00; C09K 5/02; C09K 5/06; C09K 5/063; C09K 5/14; B01J 13/08;
(Continued)

(56) References Cited

U.S. PATENT DOCUMENTS 4,756,958 A * 7/1988 Bryant ................. D01F 1/10
428/320.2
5,885,475 A * 3/1999 Salyer ................. C09K 5/063
252/70

(Continued)

FOREIGN PATENT DOCUMENTS

CN  102617646 A * 8/2012  ............ B01J 20/226
CN  104562258 A  4/2015
(Continued)

OTHER PUBLICATIONS

Wiersum et al. (Abstract of "An evaluation of UiO-66 for gas-based applications," Chemistry—An Asian Journal, vol. 6, Iss. 12, 2011) (Year: 2011).*

(Continued)

*Primary Examiner* — Matthew R Diaz
(74) *Attorney, Agent, or Firm* — Troutman Pepper Hamilton Sanders LLP; Ryan A. Schneider; Nicholas Doss

(57) ABSTRACT

A process for forming an extruded composition using a wet-spin dry-jet technique including forming a dispersion dope by mixing phase change material with a first portion of solvent, and sonicating the mixture, forming a prime dope by combining a first portion of polymer and a second portion
(Continued)

of solvent, forming an extrusion composition by combining the dispersion dope, the prime dope and a second portion of the polymer, rolling the extrusion composition, degassing the extrusion composition, extruding the extrusion composition through a spinneret, drying the extruded composition, and quenching the extruded composition. The weight fraction of the phase change material in the extruded composition can be greater than approximately 60%, and preferably greater than approximately 75%.

25 Claims, 25 Drawing Sheets

(51) Int. Cl.
*D01F 8/04* (2006.01)
*D01F 9/08* (2006.01)
*B01J 13/08* (2006.01)
*B01J 13/20* (2006.01)
*C09K 5/14* (2006.01)

(52) U.S. Cl.
CPC .............. *D01D 5/06* (2013.01); *D01F 8/04* (2013.01); *D01F 9/08* (2013.01)

(58) Field of Classification Search
CPC ........... B01J 13/206; B01J 13/22; D01D 5/04; D01D 5/06; D01D 5/24; D01D 5/247; D01F 1/10; D01F 2/00; D01F 2/24; D01F 2/28; D01F 2/30; D01F 6/58; D01F 6/60; D01F 6/605; D01F 6/62; D01F 6/70; D01F 6/72; D01F 6/78; D01F 6/80; D01F 6/82; D01F 9/04; D01F 9/08
See application file for complete search history.

(56) References Cited

U.S. PATENT DOCUMENTS

| | | | |
|---|---|---|---|
| 6,207,738 B1 | 3/2001 | Zuckerman et al. | |
| 6,793,856 B2* | 9/2004 | Hartmann | F28D 20/023 264/141 |
| 6,855,422 B2* | 2/2005 | Magill | D01F 1/10 428/373 |
| 7,160,612 B2* | 1/2007 | Magill | D01F 1/10 428/370 |
| 7,244,497 B2* | 7/2007 | Hartmann | D01F 1/10 428/373 |
| 7,579,078 B2* | 8/2009 | Hartmann | D01F 1/10 428/373 |
| 9,314,768 B2* | 4/2016 | Gueret | C09K 5/063 |
| 9,434,869 B2* | 9/2016 | Hartmann | C09K 5/063 |
| 2005/0164585 A1* | 7/2005 | Magill | D01F 1/10 442/361 |
| 2008/0233368 A1* | 9/2008 | Hartmann | D06M 23/12 428/206 |
| 2009/0178561 A1 | 7/2009 | Miller et al. | |
| 2009/0291309 A1* | 11/2009 | Salaun | C09K 5/063 428/402.2 |
| 2011/0117353 A1* | 5/2011 | Henshaw | D02G 3/443 428/221 |
| 2012/0202695 A1* | 8/2012 | Toledano | A61K 8/38 504/359 |
| 2014/0023853 A1* | 1/2014 | Gueret | C09K 5/06 428/323 |
| 2015/0105250 A1* | 4/2015 | Weston | B01J 20/28069 96/108 |
| 2015/0238892 A1* | 8/2015 | Monereau | C09K 5/063 96/108 |
| 2015/0291868 A1 | 10/2015 | Rajagopalan et al. | |
| 2016/0177002 A1* | 6/2016 | Palchik | B29C 48/29 504/359 |
| 2017/0182453 A1* | 6/2017 | Mu | B01J 20/08 |

FOREIGN PATENT DOCUMENTS

| | | | | |
|---|---|---|---|---|
| CN | 103710964 B | | 12/2015 | |
| FR | 2891159 A1 * | | 3/2007 | .......... B01D 53/047 |
| WO | WO-2008041191 A2 * | | 4/2008 | .......... D06M 23/12 |

OTHER PUBLICATIONS

Cmarik et al. ("Tuning the absorption properties of UiO-66 via ligand functionalization," Langmuir, 2012, 28, 44, 15606-15613) (Year: 2012).*

Bhattacharjee et al. ("Chromium terephthalate metal-organic framework MIL-101: synthesis, functionalization, and applications for adsorption and catalysis," RSC Adv., 2014, 4, 52500-52525) (Year: 2014).*

Sinha et al. ("Systems design and economic analysis of direct air capture of CO2 through temperature vacuum swing adsorption using MIL-101(Cr)-PEI-800 and mmen-Mg2(dobpdc) MOF adsorbents," Ind. Eng. Chem. Res., 2017, 56, 750-764, published Dec. 19, 2016) (Year: 2016).*

Park et al. ("Establishing upper bounds on CO2 swing capacity in sub-ambient pressure swing adsorption via molecular simulation of metal-organic frameworks," J. Mater. Chem. A, 2017, 5, 12258-12265) (Year: 2017).*

Search Report and Written Opinion from International Application No. PCT/US2018/048110 dated Dec. 11, 2018.

D. Hasse et al., CO2 capture by sub-ambient membrane operation, Energy Procedia, 37:993-1003, 2013.

K. S. Surana et al., Mathematical Models And Numerical Solutions Of Liquid-Solid And Solid-Liquid Phase Change, Journal of Thermal Engineering, 1(2):61-98, 2015.

* cited by examiner

INCORPORATION OF MICROENCAPSULATED PHASE CHANGE MATERIALS INTO WET-SPIN DRY JET POLYMERIC FIBERS

CROSS-REFERENCE TO RELATED APPLICATIONS

This application claims the benefit of U.S. Provisional Application No. 62/606,148, filed 16 Nov. 2017, the entire contents and substance of which is hereby incorporated by reference.

BACKGROUND OF THE INVENTION

1. Field of the Invention

The present invention generally relates to a composition, and a process for forming an extruded composition using a wet-spin dry jet technique. An exemplary extruded composition contains microencapsulated phase change materials incorporated in its structure. The extruded composition is useful in enhanced species (for example, $CO_2$) adsorption and textile materials.

2. Description of Related Art

Phase change materials (PCM) may be repeatedly converted between different phases, for example, between solid and liquid phases, or a first and a second solid phase, to utilize their latent heat of phase change to absorb, store and release heat during such phase conversions. These latent heats of fusion are greater than approximately the sensible heat capacities of the materials. For example, in phase change materials, the amount of energy absorbed upon melting or released upon freezing is greater than approximately the amount of energy absorbed or released upon increasing or decreasing the temperature of the material over an increment of, for example, 10° C.

Upon melting and freezing, for example, a phase change material absorbs and releases substantially more energy per unit weight than a sensible heat storage material that is heated or cooled over the same temperature range. In contrast to a sensible heat storage material that absorbs and releases energy essentially uniformly over a temperature range, a phase change material absorbs and releases a large quantity of energy more discretely, in the vicinity of its melting/freezing point.

Yet, it remains a challenge to effectively incorporate phase change material into fibers useful in enhanced species adsorption systems and textile materials.

Thus, a need has arisen in the art for an extruded composition (fiber) that successfully incorporates phase change material to a load percentage as of yet not reached in conventional materials. It is thus an intention of the present invention to provide an inventive process for forming an extruded composition using a wet-spin dry jet technique comprising microencapsulated phase change materials, wherein the weight fraction of the microencapsulated phase change materials in the extruded composition is greater than approximately 60%. It is a further object of the present invention to provide an extruded composition having a weight fraction of microencapsulated phase change materials of greater than approximately 60%.

BRIEF SUMMARY OF THE INVENTION

Briefly described, in a preferred form, the present invention comprises an inventive approach to the integration of phase change material into a fiber contactor by the direct spinning of microencapsulated phase change material (μPCM). In an exemplary embodiment, the PCM is integrated into a fiber sorbent contactor by the direct spinning of microencapsulated phase change material with the sorbent and a polymer. The present invention leads to far shorter heat transfer distances, leading to more efficient thermal management in the fibers and the manufacture of this platform is far easier in scaling, as limited to no additional processing is required beyond traditional fiber production.

The present invention includes the incorporation of phase change material into the fiber sorbent module to help control thermal fronts created in the fiber sorbent bed. Thermal management is a key to high swing capacity systems, as it is expected considerable inefficiencies in the bed will result from the large amounts of heat produced.

Microencapsulated phase change material—generally spherical solids with core-shell architecture to contain the phase change material—can be spun in a polymer dope mixture with metal-organic frameworks (MOFs) following a similar procedure to that of traditional fiber sorbent spinning. MOFs are compounds of metal ions or clusters coordinated to organic ligands to form one-, two-, or three-dimensional structures. They are a subclass of coordination polymers, with the special feature that they are often porous.

More formally, a metal-organic framework is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions.

In some cases, the pores are stable during elimination of the guest molecules (often solvents) and could be refilled with other compounds. Because of this property, MOFs are of interest in the present invention.

Continuity of microencapsulated PCM throughout the spinning process has been confirmed via differential scanning calorimetry, where the ratio of the fiber containing μPCM's heat of fusion to the pure species heat of fusion reflects loading fraction. While in a prior approach the shell of a fiber module was filled with μPCM, the present invention allows that phase change material can be incorporated without additional steps to place a lumen layer and pump in PCM, which makes for a simpler scale up of fiber production when compared to the prior approach.

From a transport perspective, the present morphology outperforms known approaches based on the effective heat transfer distance from the MOF to the μPCM. For example, in the noted prior approach placing μPCM in the fiber bore, reducing this distance in comparison to traditional packed beds, the maximum distance from MOF-to-μPCM was on the order of magnitude of 100 μm. The present invention, with good dispersion, reduces this distance an order of magnitude or less. In exemplary embodiments, to 1 μm or less.

In an exemplary embodiment, the present invention is a process for forming an extruded composition using a wet-spin dry-jet technique comprising forming a dispersion dope by combining phase change material with a first portion of solvent, forming a prime dope by combining a first portion of polymer and a second portion of solvent, forming an extrusion composition by combining the dispersion dope, the prime dope and a second portion of the polymer, extruding the extrusion composition through a spinneret, and quenching the extruded composition.

The phase change material can comprise microencapsulated phase change material.

The weight fraction of the phase change material in the extruded composition can be greater than approximately 60%, and more preferably greater than approximately 70%, and most preferably at approximately 75%

Forming the dispersion dope can comprises mixing the phase change material with the first portion of solvent and sonicating the mixture.

The process can further comprise rolling the extrusion composition.

The process can further comprise degassing the extrusion composition prior to extruding.

The process can further comprise drying the extruded composition through an air gap prior to quenching the extruded composition.

The process can further comprise removing at least a portion of the solvent from the extruded composition.

Forming the extrusion composition can further comprise combining a metal-organic framework (MOF).

The phase change material can comprise microencapsulated solid-liquid phase change material and be encapsulated by a barrier layer that effectively contains the phase change material during repeated freeze/melt cycles.

The phase change material can comprise solid-solid phase change material.

The phase change material can comprise microencapsulated phase change material having an average diameter of from approximately 50 nm to approximately 100 μm.

The phase change material can comprise two or more microencapsulated phase change materials of different composition.

The polymer can be selected from the group consisting of cellulose acetate, polysulfones, polyimides, polyamide-imides, polymers of intrinsic microporosity, polyetherimides, cellulosics, and polyurethanes.

The dispersion dope can further comprise an additive, and the additive can be for example activated carbon, a zeolite, a MOF, and metal oxides.

The extruded composition can comprise a fiber having a diameter from approximately 100 nm to approximately 2 mm.

The process can further comprise controlling the porosity of the extruded composition, wherein controlling the porosity of the extruded composition can comprise controlling spinning conditions and one or more of dispersion, prime dope, and extrusion composition.

In another exemplary embodiment, the present invention is a process for forming an extruded composition using a wet-spin dry-jet technique comprising forming a dispersion dope by mixing phase change material with a first portion of solvent, and sonicating the mixture, forming a prime dope by combining a first portion of polymer and a second portion of solvent, forming an extrusion composition by combining the dispersion dope, the prime dope and a second portion of the polymer, rolling the extrusion composition, degassing the extrusion composition, extruding the extrusion composition through a spinneret, drying the extruded composition, and quenching the extruded composition.

The phase change material can comprise microencapsulated phase change material.

The weight fraction of the phase change material in the extruded composition can be greater than approximately 70%.

Degassing the extrusion composition can comprise degassing the extrusion composition for at least approximately 12 hours. Degassing the extrusion composition can comprise degassing the extrusion composition for a time sufficient to remove substantially all air from the final extrusion composition. Degassing the extrusion composition can comprise degassing the extrusion composition at an elevated temperature. Degassing the extrusion composition can comprise degassing the extrusion composition at an elevated temperature under a vacuum.

Drying the extruded composition can comprise drying the extruded composition through an air gap prior to quenching the extruded composition. The air gap can be appropriately sized, for example, from approximately 1 cm to approximately 10 cm.

Quenching the extruded composition can comprise quenching the extruded composition in water.

In another exemplary embodiment, the present invention is a process for forming an extruded composition using a wet-spin dry-jet technique comprising forming a dispersion dope by mixing microencapsulated phase change material with a first portion of solvent, and sonicating the mixture, forming a prime dope by combining a first portion of polymer and a second portion of solvent, forming an extrusion composition by combining the dispersion dope, the prime dope and a second portion of the polymer, rolling the extrusion composition, degassing the extrusion composition, extruding the extrusion composition through a spinneret, drying the extruded composition, and quenching the extruded composition, wherein the weight fraction of the microencapsulated phase change material in the extruded composition is greater than approximately 70%.

The process can further comprise removing at least a portion of the solvent from the extruded composition.

Forming the extrusion composition can further comprise combining a metal-organic framework (MOF).

The phase change material can comprise microencapsulated solid-liquid phase change material and be encapsulated by a barrier layer that effectively contains the phase change material during repeated freeze/melt cycles.

The phase change material can comprise solid-solid phase change material.

The phase change material can comprise microencapsulated phase change material having an average diameter of from approximately 50 nm to approximately 100 μm.

The phase change material can comprise two or more microencapsulated phase change materials of different composition.

The polymer can be selected from the group consisting of cellulose acetate, polysulfones, polyimides, polyamide-imides, polymers of intrinsic microporosity, polyetherimides, cellulosics, and polyurethanes.

The dispersion dope can further comprise an additive, and the additive can be for example activated carbon, a zeolite, a MOF, and metal oxides.

The extruded composition can comprise a fiber having a diameter from approximately 100 nm to approximately 2 mm.

The process can further comprise controlling the porosity of the extruded composition, wherein controlling the porosity of the extruded composition can comprise controlling spinning conditions and one or more of dispersion, prime dope, and extrusion composition.

Degassing the extrusion composition can comprise degassing the extrusion composition for at least approximately 12 hours. Degassing the extrusion composition can comprise degassing the extrusion composition for a time sufficient to remove substantially all air from the final extrusion composition. Degassing the extrusion composition can comprise degassing the extrusion composition at an elevated temperature. Degassing the extrusion composition can comprise degassing the extrusion composition at an elevated temperature under a vacuum.

Drying the extruded composition can comprise drying the extruded composition through an air gap prior to quenching the extruded composition. The air gap can be appropriately sized, for example, from approximately 1 cm to approximately 10 cm.

Quenching the extruded composition can comprise quenching the extruded composition in water.

Preferably, the present composition is well-blended forming a single elongate fiber. This is opposed to a multi-component fiber having two or more elongate members, each formed of a different composition, and each running along the length of the fiber without crossing interfaces. Examples of such multi-component fibers include core/sheath fibers having one or more core members running the length of the fiber, and the core(s) all located within one or more sheath members running the length of the fiber. A sheath member can have an annular cross-section if it contains for example a single, centrally co-located core member.

In another example of a family of multi-component fibers includes a set of elongated members arranged in an island-in-sea configuration, or in a striped configuration, or in a segmented-pie configuration where at least two of the elongate pie members having a different composition from one another, and the elongate pie members separately extending along the length of the multi-component fiber.

Yet another example of a multi-component fiber can include side-by-side elongate members, each running the length of the fiber.

Compared to other polymeric fibers with phase change materials incorporated therein, the present invention produces fibers with higher weight loading (greater than approximately 60% and preferably approximately 75% (or more) of composite fiber weight being phase change material), without the use of additional binder outside of the fiber itself. And unlike the current state of the art, the present process is not a coating process Additionally, the present process (wet spin dry jet) allows for the incorporation of other materials into the fiber, including adsorbent materials that may be used for chemical separations such as MOF and zeolite materials. The conventional art contains Wet and Dry spin techniques, but not the present hybrid technique.

Incorporation of phase change materials in fiber with sorbent materials allows for the management of thermal energy within adsorption cycles, expected to buffer the large temperature swings that may arise in pressure swing adsorption processes. Such a composite sorbent/phase change material/fiber contactor has never been produced with microencapsulated phase change materials in the fiber.

These and other objects, features and advantages of the present invention will become more apparent upon reading the following specification in conjunction with the accompanying drawing figures.

As used herein, heat of fusion, enthalpy of fusion, phase transition enthalpy and latent heat (of fusion) are interchangeable and mean the change in enthalpy resulting from providing energy, typically heat, to a specific quantity of the substance to change its state at a pressure.

Figure 18:
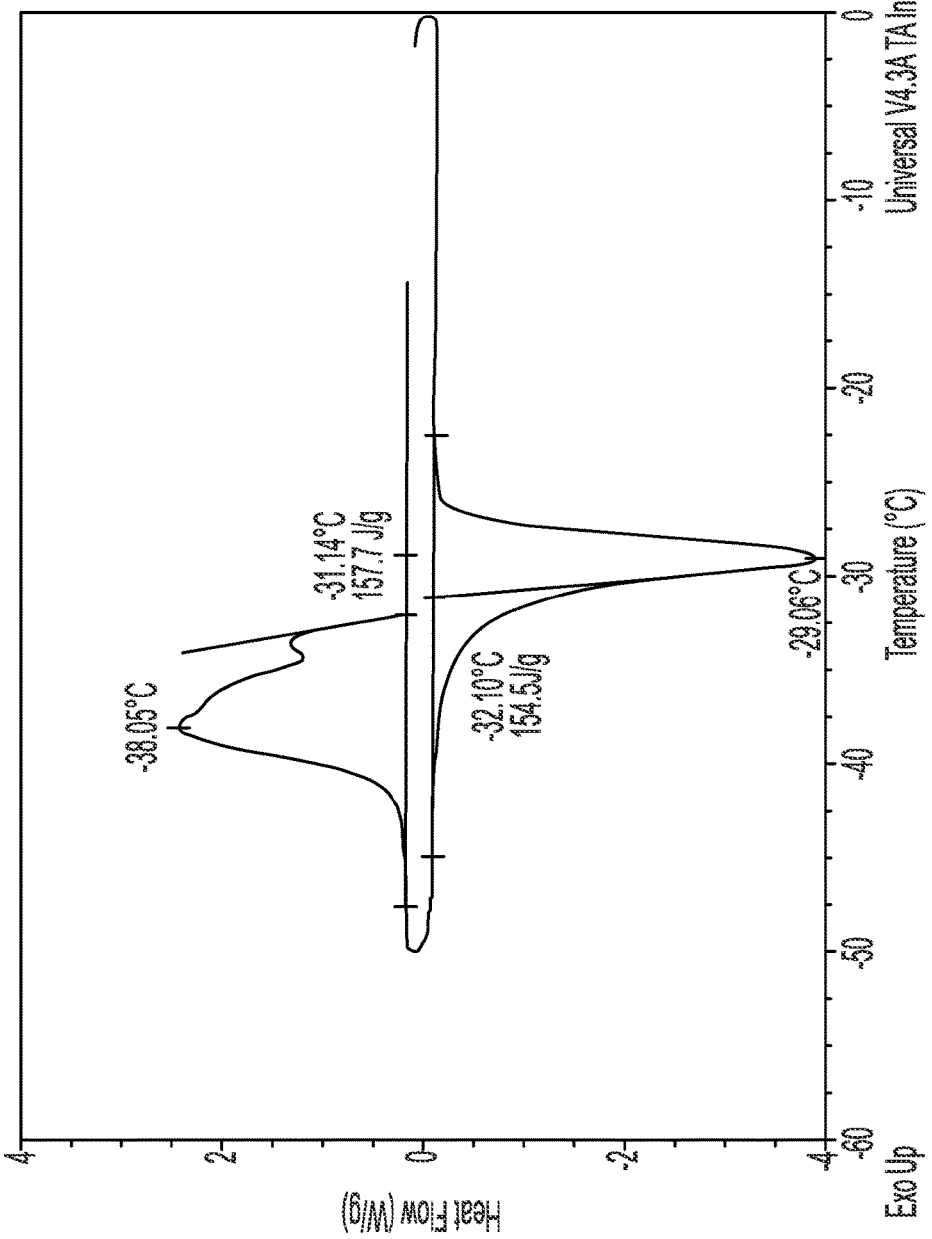
FIG. 18. Graph of Differential Scanning Analysis (DSC) of microencapsulated phase change material. Phase change materials show a heat of fusion of ~150 J/g (repeated analysis show weighing errors account for possible error of about 5%). As this is the clean microencapsulated phase change material, this value (150 J/g) is used as comparison to the fibers to determine approximate weight loading of phase change material in the fiber.
Figure 19:
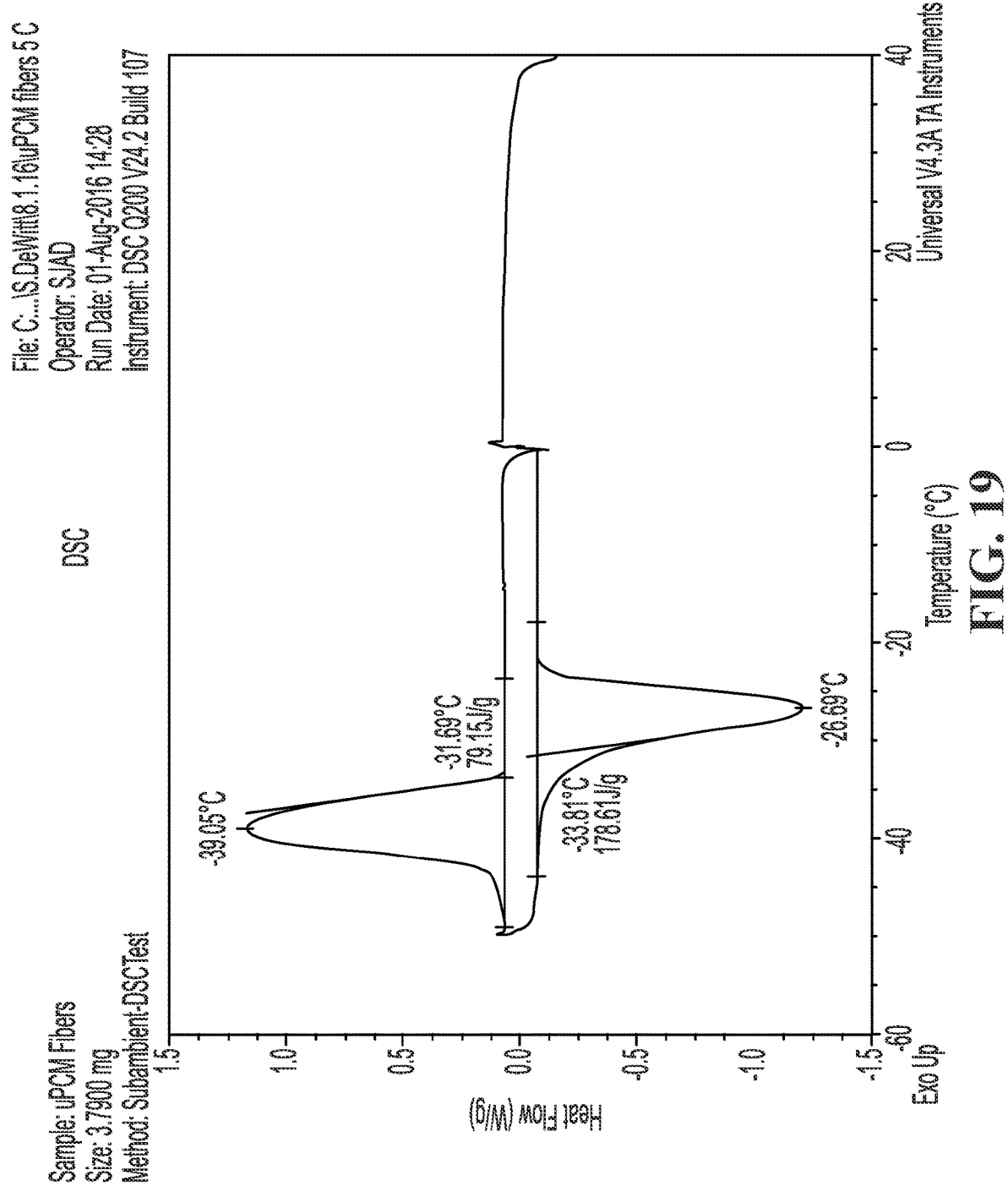

FIG. 19. Graph of DSC analysis of expected weight fraction of 50% microencapsulated phase change materials. Expected weight percentage based on dope composition. Comparison of this analysis to that of FIG. 19 shows about a weight fraction of 51-52% microencapsulated phase change material, within expected error. SEMs shown in FIGS. 4-7 show little to no physical change in microencapsulated material after spinning. FIG. 19 confirms that operability of the phase change material is not lost due to incorporation in fibers. Slight temperature shift can be related to lag in instrument due to conduction through polymer to reach phase change material. This lag also effectively groups the previous two freezing peaks seen in FIG. 18. to one singular peak.

Figure 20:
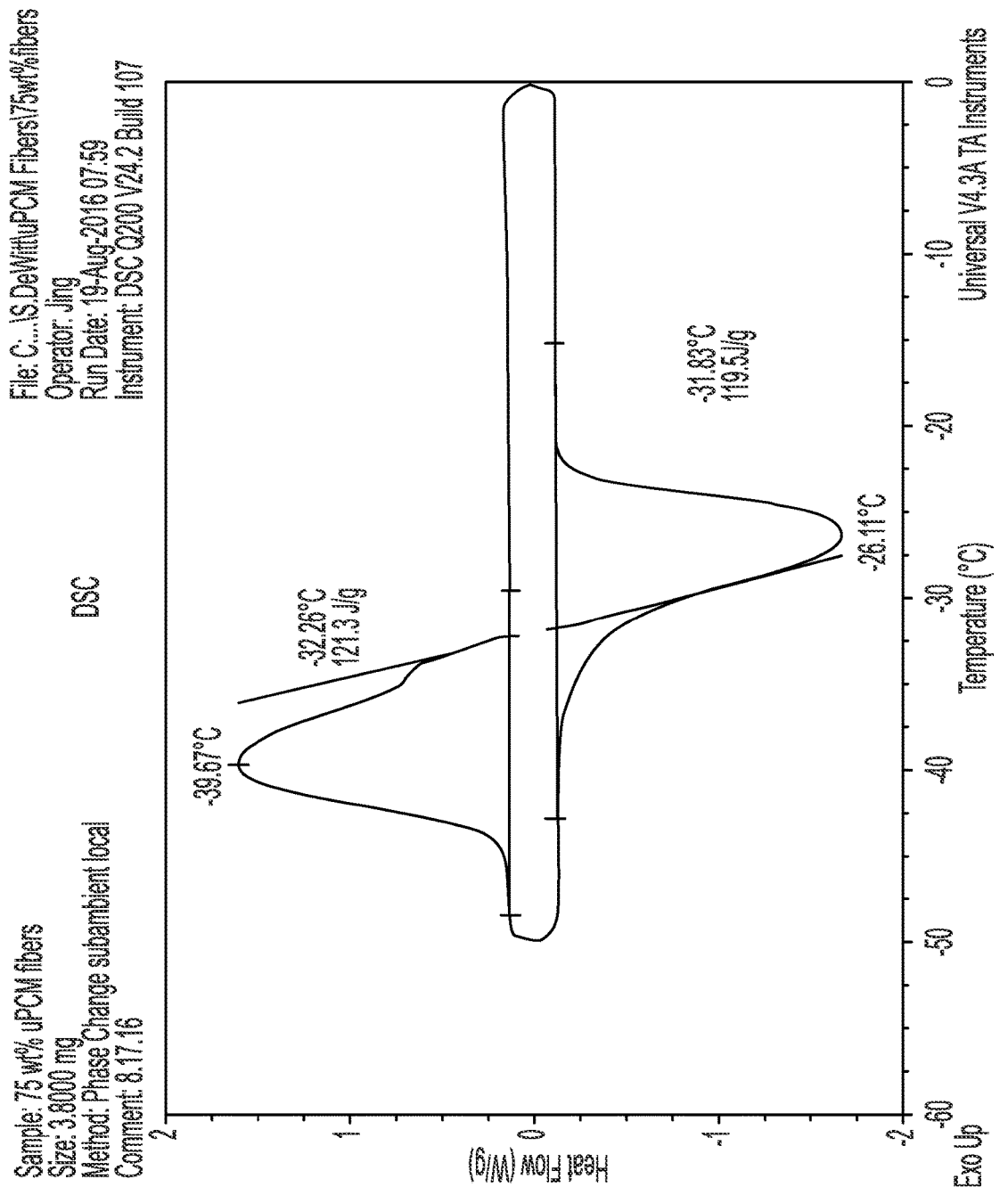

FIG. 20. Graph of DSC analysis of a weight fraction of 75% fibers. As with FIG. 19, when compared to the normal μPCM materials there is a slight overestimation (this analysis shows about 80% of the weight should be phase change material, where the dope composition was approximately 75%). This result confirms that the microencapsulated phase change material survives and continues to perform even at extremely high loadings (higher than anywhere in the literature)

Figure 21:
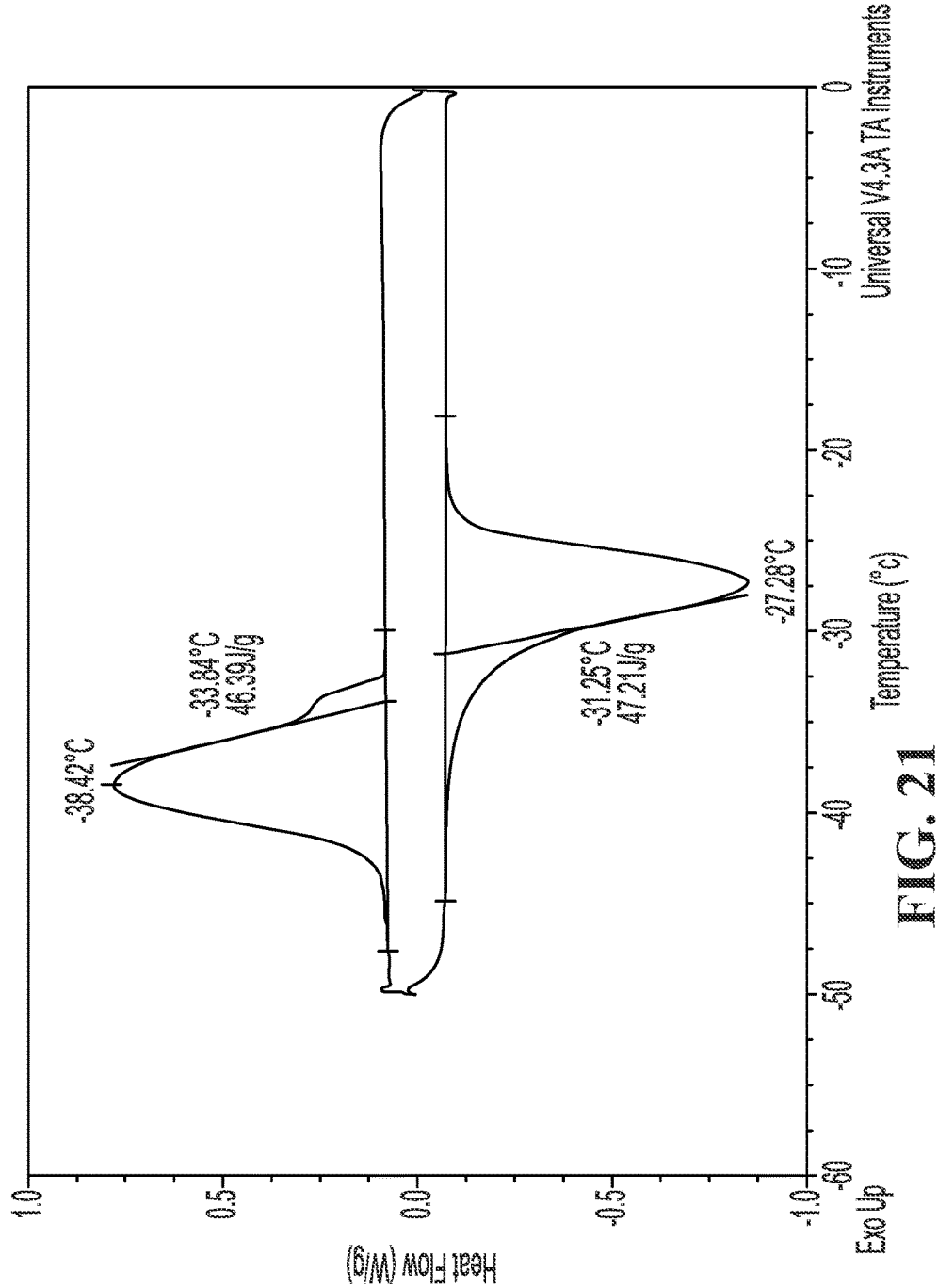

FIG. 21. Graph of DSC analysis of 35% MOF-38% μPCM—with the balance being cellulose acetate fibers. Loading as calculated in comparison to regular μPCM shows μPCM loading of about 32%. This shows some small losses, which are expected due to rolonged time in a vacuum oven at higher than expected temperatures. Confirms that the majority of the μPCM survives spinning, even with a sorbent material in the dope accompanying the μPCM.

Figures 22A, 22B:
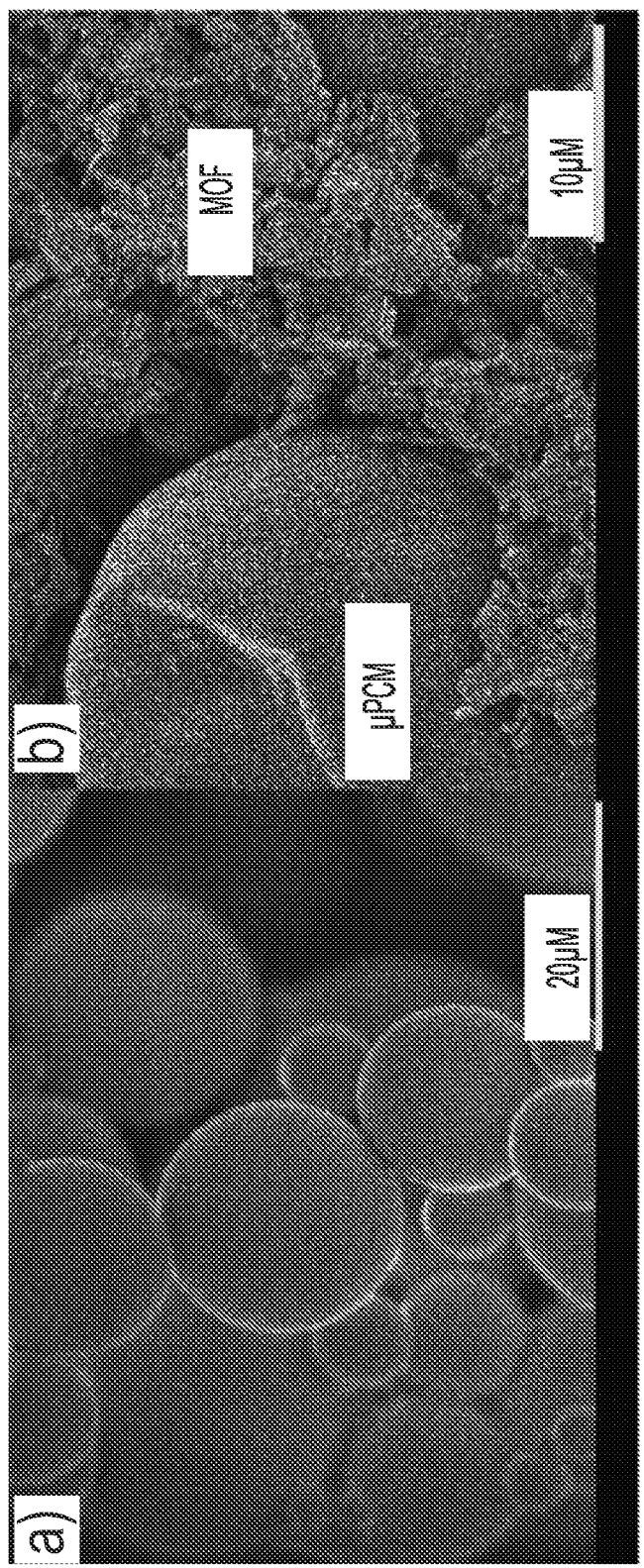

FIG. 22(a). Image of an example of out-of-container μPCM. The encapsulating polymer effectively contains the phase change materials enclosed in the same way a barrier layer would hold the phase change material in the bore of the fiber. Therefore, as long as μPCM can be spun into the fiber sorbent platform, the post-spinning installation of barrier layers would not be necessary. Observing this possible manufacturing benefit, the direct spinning of μPCM with the metal organic framework (MOF) UiO-66 was explored. Dopes were prepared in a similar manner to spinning of fiber sorbents, and cellulose acetate-μPCM-UiO-66 fibers were spun.

FIG. 22(b) is an SEM image of a cross section of one such fiber. After solvent exchange and drying the fibers' loadings of UiO-66 and μPCM were confirmed via thermogravimetric analysis and differential scanning calorimetry respectively, which showed the MOF and μPCM both survived the spinning process. Thus, phase change material was successfully integrated into the fiber sorbents.

Figure 24:
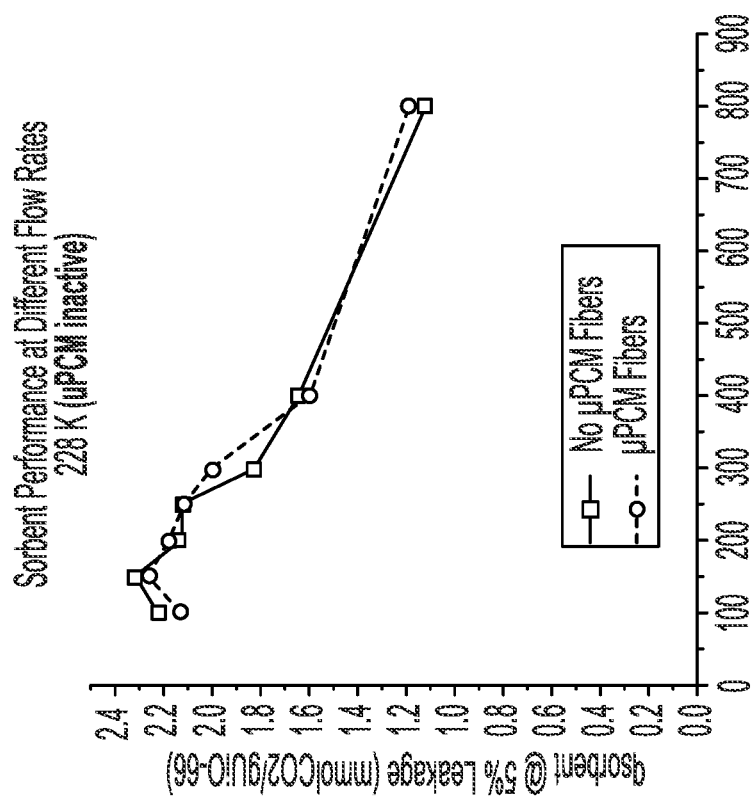
Figure 23:
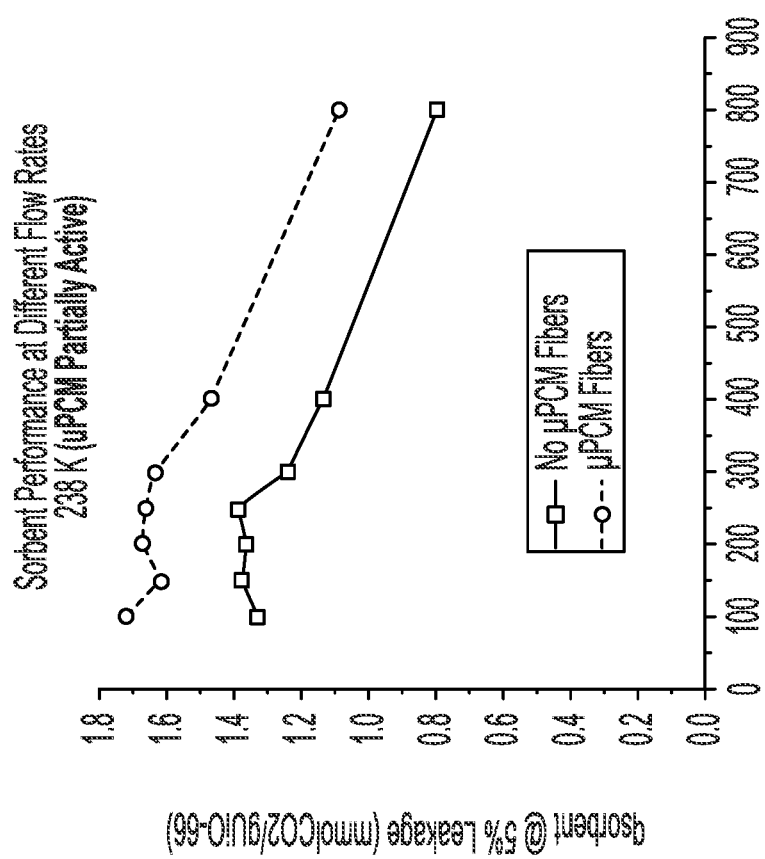

FIGS. 23-24 are graphs of breakthrough capacity per gram of sorbent for composite (PCM containing, upper) and max loaded "MOF only" fibers (lower/darker). FIG. 23 shows phase change material is active, and FIG. 24 shows phase change material is inactive.

Figure 25:
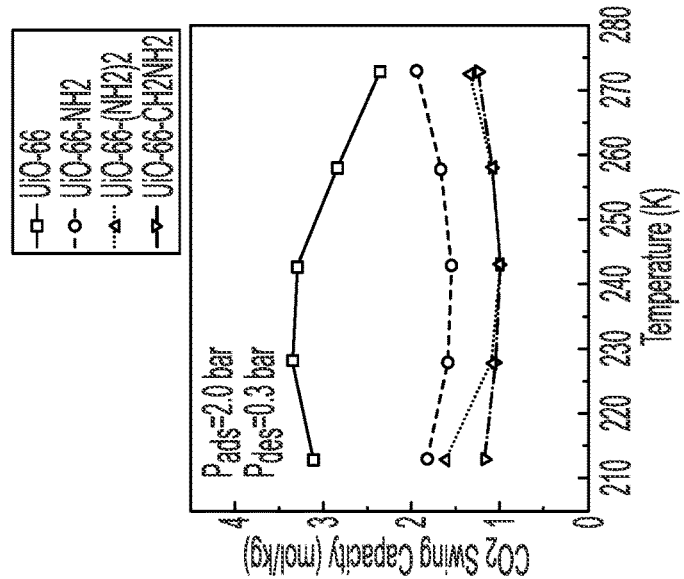
Figure 26:
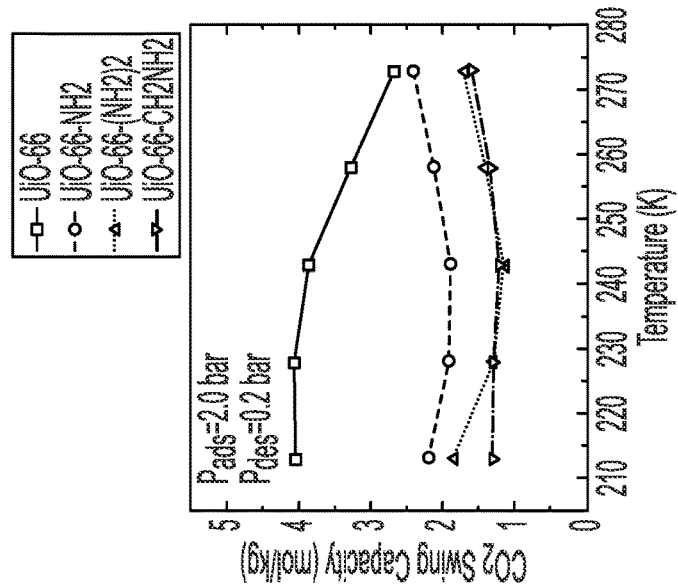
Figure 27:
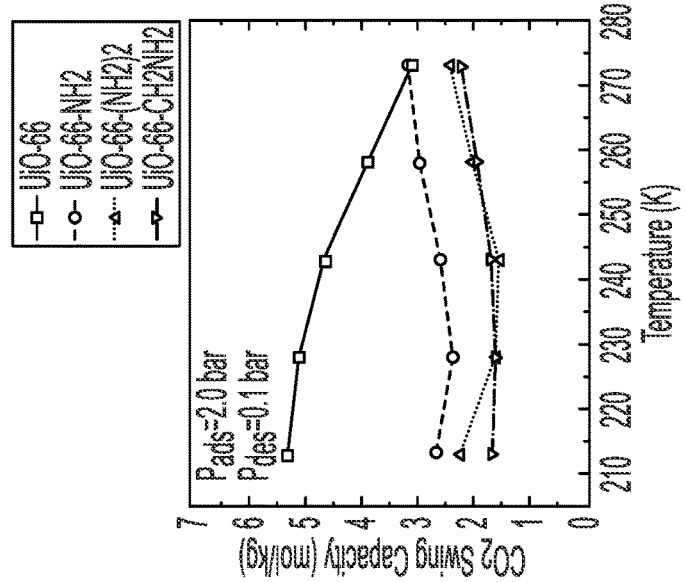

FIGS. 25-27 are graphs of swing capacity as a function of temperature for a variety of UiO-66 constituents. All figures are at adsorption pressure 2 bar $CO_2$, (FIG. 25) desorption pressure 0.1 bar, (FIG. 26) desorption pressure 0.2 bar, (FIG. 27) desorption pressure 0.3 bar.

Figure 28:
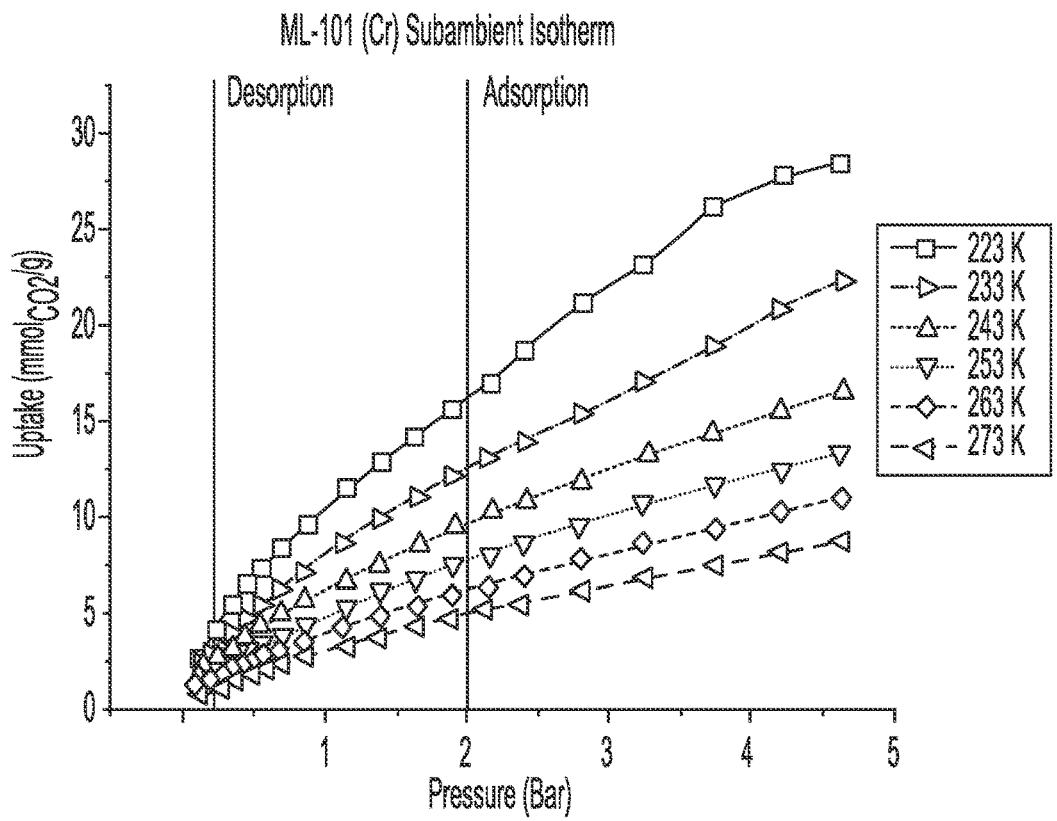
Figure 29:
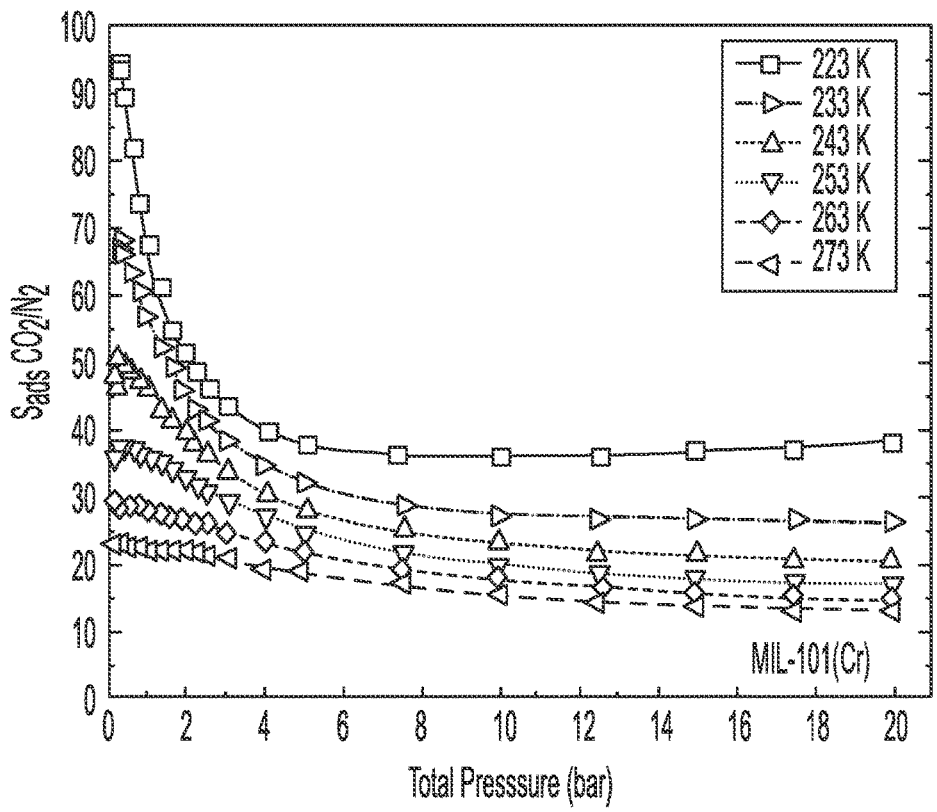

FIG. 28 is a graph of MIL-101(Cr) $CO_2$ adsorption isotherm, and FIG. 29 a graph of $CO_2/N_2$ selectivity of MIL-101(Cr) as a function of total pressure.

DETAIL DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Phase change materials have been incorporated into a variety of systems for their ability to dampen rapid temperature change around their region of consideration. The present invention comprises a novel process for incorporation of phase change materials into fibers, through wet spinning-dry jet spinning of polymeric dopes with microencapsulated phase change materials incorporated into the dopes.

The present method offers the ability to incorporate phase change materials into polymeric contactors (fibers in an exemplary embodiment) to weight fractions greater than approximately 60%, and more preferably 75% or more.

In other exemplary embodiments, the phase change material weight fraction can be lower than approximately 60% for example, but an additive can be incorporated in the composition. For example, in an extruded composition, and in a method of forming same, the composition/method can comprise an additive, phase change material, and polymer, where the polymer weight fraction is less than a 50%. In some instances, the weight fraction of the polymer can be 20% or less. Thus, fiber sorbents and other additive applications of the present invention can comprise less than a weight fraction 50% of phase change material, but the overall composition contains the phase change material and additive inside the fiber. For example, with an additive comprising UiO-66, the weight fraction of phase change material can be from approximately 30% to approximately 40%, and the weight fraction of the polymer can be approximately 25%.

In a first exemplary process for forming an extruded composition using a wet-spin dry jet technique, the present invention can comprise forming a dispersion dope by combining phase change material with a first portion of solvent, forming a prime dope by combining a first portion of polymer and a second portion of solvent, forming an extrusion composition by combining the dispersion dope, the prime dope and a second portion of the polymer, extruding the extrusion composition through a spinneret, and quenching the extruded composition.

All exemplary processes can include any one or more of the following attributes. In those circumstances where a combination of two or more of the following attributes diverge from a workable process, one of ordinary skill in the art will understand how to modify any such one or more divergent attributes to arrive at another exemplary embodiment of the present invention under an exemplary process.

The extruded composition can comprise a fiber having a diameter from approximately 100 nm to approximately 2 mm.

The phase change material can comprise solid-solid phase change material.

The phase change material can comprise microencapsulated phase change material. In some embodiments, the weight fraction of the microencapsulated phase change material in the extruded composition is greater than approximately 70%.

The phase change material can comprise microencapsulated solid-liquid phase change material, and the microencapsulated phase change material can be encapsulated by a barrier layer that effectively contains the phase change material during repeated freeze/melt cycles.

The phase change material can comprise microencapsulated phase change material having an average diameter of from approximately 50 nm to approximately 100 µm.

The phase change material can comprise two or more microencapsulated phase change materials of different composition.

The extruded composition can form an elongate volume defined as that portion of the extruded composition contained within an exterior surface, and the extruded composition can be configured such that upon a phase transition of a phase transition portion of the phase change material, the phase transition portion of the phase change material remains in the elongate volume.

In some embodiments, at least a portion of the phase change material has a phase transition enthalpy of greater than approximately 50 J/g.

In some embodiments, all of the phase change material has a phase transition enthalpy of approximately 150 J/g.

In some embodiments, the extruded composition (not just the phase change material) has a phase transition enthalpy of greater than approximately 60 J/g.

In some embodiments, the weight fraction of the phase change material in the extruded composition is greater than approximately 60%.

Forming the dispersion dope can comprise mixing the phase change material with the first portion of solvent and sonicating the mixture.

The process can further comprise rolling the extrusion composition.

The process can further comprise degassing the extrusion composition prior to extruding.

The process can further comprise drying the extruded composition through an air gap prior to quenching the extruded composition.

The process can further comprise removing at least a portion of the solvent from the extruded composition.

The process can further comprise controlling the porosity of the extruded composition. Controlling the porosity of the extruded composition can comprise controlling spinning conditions and one or more of dispersion, prime dope, and extrusion composition.

Forming the extrusion composition can further comprise combining a metal-organic framework (MOF).

The polymer can be selected from the group consisting of cellulose acetate, polysulfones, polyimides, polyamide-imides, polymers of intrinsic microporosity, polyetherimides, cellulosics, and polyurethanes.

The dispersion dope can further comprise one or more additives. An additive can be selected from the group consisting of activated carbon, a zeolite, a MOF, and metal oxides. The combined weight fraction of the additive and phase change material can be greater than approximately 50%, more preferably greater than approximately 60%, and most preferably greater than approximately 70%.

In embodiments with one or more additives, the weight fraction of the polymer can be from approximately 20 to approximately 50%, wherein the combined weight fraction of the additive and phase change material is greater than approximately 50%, and wherein the extruded composition has a phase transition enthalpy of greater than approximately 70 J/g.

In embodiments with one or more additives, the extruded composition can form an elongate volume defined as that portion of the extruded composition contained within an exterior surface, wherein the extruded composition is configured such that upon a phase transition of the phase change material, the phase change material and additive remain in the elongate volume.

In a second exemplary process for forming an extruded composition using a wet-spin dry jet technique, the present invention can comprise forming a dispersion dope by mixing phase change material with a first portion of solvent, and sonicating the mixture, forming a prime dope by combining a first portion of polymer and a second portion of solvent, forming an extrusion composition by combining the dispersion dope, the prime dope and a second portion of the polymer, rolling the extrusion composition, degassing the extrusion composition, extruding the extrusion composition through a spinneret, drying the extruded composition, and quenching the extruded composition.

All exemplary processes can include any one or more of the following attributes. In those circumstances where a combination of two or more of the following attributes diverge from a workable process, one of ordinary skill in the art will understand how to modify any such one or more divergent attributes to arrive at another exemplary embodiment of the present invention under an exemplary process.

The phase change material can comprise microencapsulated phase change material, and the weight fraction of the microencapsulated phase change material in the extruded composition can be greater than approximately 70%.

The extruded composition can form an elongate volume defined as that portion of the extruded composition contained within an exterior surface, and the extruded composition can be configured such that upon a phase transition of a phase transition portion of the phase change material, the phase transition portion of the phase change material remains in the elongate volume.

At least a portion of the phase change material can have a phase transition enthalpy of greater than approximately 50 J/g.

The phase change material can have a phase transition enthalpy of approximately 150 J/g.

The extruded composition can have a phase transition enthalpy of greater than approximately 70 J/g.

Degassing the extrusion composition can comprise degassing the extrusion composition for at least approximately 12 hours. degassing the extrusion composition can comprise degassing the extrusion composition for a time sufficient to remove substantially all air from the final extrusion composition. Degassing the extrusion composition can comprise degassing the extrusion composition at an elevated temperature. Degassing the extrusion composition can comprise degassing the extrusion composition at an elevated temperature under a vacuum.

Drying the extruded composition can comprise drying the extruded composition through an air gap prior to quenching the extruded composition. The air gap can be from approximately 1 cm to approximately 10 cm.

Quenching the extruded composition can comprise quenching the extruded composition in water.

The weight fraction of the polymer can be from approximately 20 to approximately 50%, and the combined weight fraction of the additive and phase change material can be greater than approximately 50%.

The dispersion dope can further comprise an additive, wherein the extruded composition forms an elongate volume defined as that portion of the extruded composition contained within an exterior surface, and wherein the extruded composition is configured such that upon a phase transition of the phase change material, the phase change material and additive remain in the elongate volume.

In a third exemplary process for forming an extruded composition using a wet-spin dry jet technique, the present invention can comprise forming a dispersion dope by mixing microencapsulated phase change material with a first portion of solvent, and sonicating the mixture, forming a prime dope by combining a first portion of polymer and a second portion of solvent, forming an extrusion composition by combining the dispersion dope, the prime dope and a second portion of the polymer, rolling the extrusion composition, degassing the extrusion composition, extruding the extrusion composition through a spinneret, drying the extruded composition, and quenching the extruded composition, wherein the weight fraction of the microencapsulated phase change material in the extruded composition is greater than approximately 70%.

All exemplary processes can include any one or more of the following attributes. In those circumstances where a combination of two or more of the following attributes diverge from a workable process, one of ordinary skill in the art will understand how to modify any such one or more divergent attributes to arrive at another exemplary embodiment of the present invention under an exemplary process.

The extruded composition can comprise a fiber having a diameter from approximately 100 nm to approximately 2 mm.

The process can further comprise controlling the porosity of the extruded composition. Controlling the porosity of the extruded composition can comprise controlling spinning conditions and one or more of dispersion, prime dope, and extrusion composition.

Degassing the extrusion composition can comprise degassing the extrusion composition for at least approximately 12 hours. Degassing the extrusion composition can comprise degassing the extrusion composition for a time sufficient to remove substantially all air from the final extrusion composition. Degassing the extrusion composition can comprise degassing the extrusion composition at an elevated temperature. Degassing the extrusion composition can comprise degassing the extrusion composition at an elevated temperature under a vacuum.

Drying the extruded composition can comprise drying the extruded composition through an air gap. The air gap can be from approximately 1 cm to approximately 10 cm.

Quenching the extruded composition can comprise quenching the extruded composition in water.

The process can further comprise removing at least a portion of the solvent from the extruded composition.

Forming the extrusion composition can further comprises combining a MOF.

The microencapsulated phase change material can comprise microencapsulated solid-liquid phase change material, and the microencapsulated phase change material can be encapsulated by a barrier layer that effectively contains the phase change material during repeated freeze/melt cycles.

The microencapsulated phase change material can comprise solid-solid phase change material. The microencapsulated phase change material can comprise microencapsulated phase change material having an average diameter of from approximately 50 nm to approximately 100 nm. The microencapsulated phase change material can comprise two or more microencapsulated phase change materials of different composition.

The polymer can be selected from the group consisting of cellulose acetate, polysulfones, polyimides, polyamide-imides, polymers of intrinsic microporosity, polyetherimides, cellulosics, and polyurethanes.

The extruded composition can form an elongate volume defined as that portion of the extruded composition contained within an exterior surface, and the extruded composition can be configured such that upon a phase transition of the microencapsulated phase change material, the microencapsulated phase change material remains in the elongate volume.

The microencapsulated phase change material can have a phase transition enthalpy of greater than approximately 50 J/g. The microencapsulated phase change material can have a phase transition enthalpy of approximately 150 J/g.

The extruded composition can a phase transition enthalpy of greater than approximately 60 J/g.

The dispersion dope can further comprise one or more additives. An additive can be selected from the group consisting of activated carbon, a zeolite, a MOF, and metal oxides.

The extruded composition can form an elongate volume defined as that portion of the extruded composition contained within an exterior surface, and the extruded composition can be configured such that upon a phase transition of the phase change material, the phase change material and additive remain in the elongate volume.

In a fourth exemplary embodiment of the present invention, an extruded composition can comprise phase change material and a polymer, wherein one or more of apply (i) the extruded composition forms an elongate volume defined as that portion of the extruded composition contained within an exterior surface, and the extruded composition is configured such that upon a phase transition of a phase transition portion of the phase change material, the phase transition portion of the phase change material remains in the elongate volume, (ii) at least a portion of the phase change material has a phase transition enthalpy of greater than approximately 50 J/g, (iii) the extruded composition has a phase transition enthalpy of greater than approximately 60 J/g.

All exemplary extruded compositions can include any one or more of the following attributes. In those circumstances where a combination of two or more of the following attributes diverge from a workable extruded composition, one of ordinary skill in the art will understand how to modify any such one or more divergent attributes to arrive at another exemplary embodiment of the present invention under an exemplary extruded composition.

The phase change material can have a phase transition enthalpy of approximately 150 J/g.

The weight fraction of the phase change material in the extruded composition can be greater than approximately 60%. The weight fraction of the phase change material in the extruded composition can be greater than approximately 70%.

The phase change material can comprise two or more microencapsulated phase change materials of different composition.

The phase change material can comprise solid-solid phase change material.

The phase change material can comprise microencapsulated phase change material.

The phase change material can comprise microencapsulated phase change material having a diameter of from approximately 70 nm-100 µm.

The phase change material can comprise microencapsulated solid-liquid phase change material, and the microencapsulated phase change material can be encapsulated by a barrier layer that effectively contains the phase change material during repeated freeze/melt cycles.

The extruded composition can further comprise a metal-organic framework (MOF).

The polymer can be selected from the group consisting of cellulose acetate, polysulfones, polyimides, polyamide-imides, polymers of intrinsic microporosity, polyetherimides, cellulosics, and polyurethanes.

The extruded composition can further comprise one or more additives. An additive can be selected from the group consisting of activated carbon, a zeolite, a MOF, and metal oxides. The combined weight fraction of one or more additives and phase change material can be greater than approximately 50%. The combined weight fraction of one or more additives and phase change material can be greater than approximately 60%. The combined weight fraction of one or more additives and phase change material can be greater than approximately 70%.

The extruded composition can comprise a fiber having a diameter from approximately 100 nm to approximately 2 mm.

The weight fraction of the polymer can be from approximately 20 to approximately 50%, wherein the combined weight fraction of one or more additives and phase change material can be greater than approximately 50%, and wherein the extruded composition can have a phase transition enthalpy of greater than approximately 70 J/g.

The extruded composition can form an elongate volume defined as that portion of the extruded composition contained within an exterior surface, and the extruded composition can be configured such that upon a phase transition of the phase change material, the phase change material and additive remain in the elongate volume.

In a fifth exemplary embodiment of the present invention, a wet-spin dry-jet fiber comprises microencapsulated phase change material and a polymer, wherein the microencapsulated phase change material has a phase transition enthalpy of greater than approximately 50 J/g, wherein the fiber has a phase transition enthalpy of greater than approximately 60 J/g, and wherein the weight fraction of the phase change material in the fiber is greater than approximately 60%.

All exemplary wet-spin dry-jet fibers can include any one or more of the following attributes. In those circumstances where a combination of two or more of the following attributes diverge from a workable wet-spin dry jet fiber, one of ordinary skill in the art will understand how to modify any such one or more divergent attributes to arrive at another exemplary embodiment of the present invention under an exemplary wet-spin dry-jet fiber.

The weight fraction of the microencapsulated phase change material in the fiber can be greater than approximately 70%.

The fiber can further comprise a metal-organic framework (MOF).

The microencapsulated phase change material can be encapsulated by a barrier layer that effectively contains the phase change material during repeated freeze/melt cycles.

The microencapsulated phase change material can comprise microencapsulated solid-solid phase change material.

The microencapsulated phase change material can have an average diameter of from approximately 50 nm to approximately 100 μm.

The microencapsulated phase change material can comprise two or more microencapsulated phase change materials of different composition.

The polymer can be selected from the group consisting of cellulose acetate, polysulfones, polyimides, polyamide-imides, polymers of intrinsic microporosity, polyetherimides, cellulosics, and polyurethanes.

The fiber can further comprise one or more additives. An additive can be selected from the group consisting of activated carbon, a zeolite, a MOF, and metal oxides.

The combined weight fraction of any additives and phase change material can be greater than approximately 70%.

The fiber can have a diameter from approximately 100 nm to approximately 2 mm.

The fiber can form an elongate volume defined as that portion of the fiber contained within an exterior surface, and the fiber can be configured such that upon a phase transition of the phase change material, the phase change material and any additives remain in the elongate volume.

In a sixth exemplary embodiment of the present invention, an extruded composition can be formed by a wet-spin dry jet process comprising forming a dispersion dope by combining phase change material with a first portion of solvent, forming a prime dope by combining a first portion of polymer and a second portion of solvent, forming an extrusion composition by combining the dispersion dope, the prime dope and a second portion of the polymer, extruding the extrusion composition through a spinneret, and quenching the extruded composition.

All exemplary extruded compositions can include any one or more of the following attributes. In those circumstances where a combination of two or more of the following attributes diverge from a workable extruded composition, one of ordinary skill in the art will understand how to modify any such one or more divergent attributes to arrive at another exemplary embodiment of the present invention under an exemplary extruded composition.

The phase change material can comprise microencapsulated phase change material.

The weight fraction of the phase change material in the extruded composition can be greater than approximately 60%. The weight fraction of the phase change material in the extruded composition can be greater than approximately 70%.

The extruded composition can form an elongate volume defined as that portion of the extruded composition contained within an exterior surface, and wherein the extruded composition is configured such that upon a phase transition of a phase transition portion of the phase change material, the phase transition portion of the phase change material remains in the elongate volume.

At least a portion of the phase change material can have a phase transition enthalpy of greater than approximately 50 J/g. The phase change material can have a phase transition enthalpy of approximately 150 J/g. The extruded composition can have a phase transition enthalpy of greater than approximately 60 J/g.

Forming the dispersion dope can comprise mixing the phase change material with the first portion of solvent and sonicating the mixture.

The process can further comprise rolling the extrusion composition. The process can further comprise degassing the extrusion composition prior to extruding. The process can further comprise drying the extruded composition through an air gap prior to quenching the extruded composition. The process can further comprise removing at least a portion of the solvent from the extruded composition. The process can further comprise controlling the porosity of the extruded composition.

Forming the extrusion composition can further comprise combining a metal-organic framework (MOF).

Quenching the extruded composition can comprise quenching the extruded composition in water.

Degassing the extrusion composition can comprise degassing the extrusion composition for at least approximately 12 hours. Degassing the extrusion composition can comprise degassing the extrusion composition for a time sufficient to remove substantially all air from the final extrusion composition. Degassing the extrusion composition can comprise degassing the extrusion composition at an elevated temperature. Degassing the extrusion composition can comprise degassing the extrusion composition at an elevated temperature under a vacuum.

Drying the extruded composition can comprise drying the extruded composition through an air gap prior to quenching the extruded. The air gap can be from approximately 110 cm.

Controlling the porosity of the extruded composition can comprise controlling spinning conditions and one or more of dispersion, prime dope, and extrusion composition.

The phase change material can comprise microencapsulated solid-liquid phase change material, and the microencapsulated phase change material is encapsulated by a barrier layer that effectively contains the phase change material during repeated freeze/melt cycles.

The phase change material can comprise solid-solid phase change material. The phase change material can comprise microencapsulated phase change material having an average diameter of from approximately 50 nm to approximately 100 μm. The phase change material can comprise two or more microencapsulated phase change materials of different composition.

The polymer can be selected from the group consisting of cellulose acetate, polysulfones, polyimides, polyamide-imides, polymers of intrinsic microporosity, polyetherimides, cellulosics, and polyurethanes.

The extruded composition can comprise a fiber having a diameter from approximately 100 nm to approximately 2 mm.

The dispersion dope further comprises one or more additives. An additive can be selected from the group consisting of activated carbon, a zeolite, a MOF, and metal oxides.

The combined weight fraction of any of the additives and phase change material can greater than approximately 50%. The combined weight fraction of any of the additives and phase change material can greater than approximately 60%. The combined weight fraction of any of the additives and phase change material can greater than approximately 70%.

Additionally, the present process allows for other materials, like sorbent or catalyst particles, to be introduced "next to" the phase change materials. This allows for better thermal regulation of processes involving such materials, particularly cyclic pressure swing adsorption processes, where a great deal of heat can be generated in the adsorption step and be required to be inputted during the desorption step. Incorporation of phase change materials directly into the fiber, "next to" the sorbent results in a much more efficient process.

Fibers can be produced with extremely high phase change material (higher than those found in patent literature) loading using the present wet-spin dry jet technique. This technique also allows the incorporation of other materials, such as sorbents used for chemical separations, with the phase change material. The present composite fiber-sorbent-phase change material allows for better thermal management of cyclic operations where heat is released/required.

One application of PCM-loaded fibers may be as gas-gas heat exchangers. In such an application the latent heat of fusion of the PCM-containing fibers are leveraged as a high energy density intermediate between two streams, one stream at a temperature above the phase change materials melting point, the other stream below the melting point. In such an application, first the hot stream is flowed over the composite fiber bed, heating the bed to the melting point of the PCM, then melting the PCM in the fibers. The gas from this hot stream then leaves colder than it entered, near a desired temperature set by the PCM. The bed is then fed the cooler stream, which receives heat first from the latent heat of fusion from the PCM. This is analogous to a sorption process, where the PCM would be like the sorbent, the hot stream the sorption step and the cold stream the recovery step.

In an exemplary process, microencapsulated phase change materials are first incorporated into a polymeric dope (for example, cellulose acetate/polyvinylpyrrolidone) through a series of high powered sonication and mixing using an impeller. Microencapsulated phase change materials are incorporated into a fraction of the dope's solvent so as to be evenly dispersed throughout the dope. If other solids are to be added (for example, sorbents) to further functionalize the fibers, they can be added either during this step, or immediately following this step with whatever sonication and mixing steps would otherwise be required. A "Prime Dope" with the remaining solvent and an equivalent fraction of polymer is then introduced and additional sonication and mixing steps are carried out. The dope is completed when the remaining required polymer is added and stirred until fully incorporated.

Once all polymer has been incorporated, the completed dope is loaded into a spinning system, and allowed to degas for 12 hours to remove air bubbles. Fibers are produced through extruding the dope through a spinneret through a low air gap (for example, 3-10 cm) then through a water bath and unto a take up drum. Solvent exchange in water is carried out daily for three days.

For some encapsulated phase change materials, no methanol or hexane solvent exchange is used due to the negative effects methanol soaking can have on the microencapsulant.

In exemplary embodiments, the microencapsulated phase change materials are solid-liquid phase change materials that comprise a barrier layer encapsulating the phase change material, effectively containing the phase change material during repeated freeze/melt cycles. In these embodiments, phase change material can be organic, inorganic, or eutectic, so long as it has been encapsulated. Microcapsules can vary from 50 nm-100 μm in diameter and may be polydisperse. Their density can vary widely depending on the selection of phase change materials. The barrier (polymer) layer should be selected to contain the phase change material when exposed for prolonged periods (>72 hours) to water and spinning solvents. The barrier (polymer) layer further should be selected to contain the phase change material when in the presence of solvents and water, and during the time that mixture undergoes high intensity sonication. Outside of stability, the microencapsulated phase change material further should be selected to be spinable, capable when extruded to produce a continuous jet from the spinneret.

In exemplary embodiments, the phase change material may also be a solid-solid phase change material, no longer necessitating encapsulation, with similar stability and spinability requirements as that of the microencapsulated phase change material. These materials undergo a solid-solid phase transition, where the material's crystal structure undergoes a reversible change of phase, resulting in heat release over a relatively small temperature range.

Phase change materials that can be used in conjunction with various embodiments of the present invention include various organic and inorganic substances. Examples of phase change materials include hydrocarbons (e.g., straight-chain alkanes or paraffinic hydrocarbons, branched-chain alkanes, unsaturated hydrocarbons, halogenated hydrocarbons, and alicyclic hydrocarbons), hydrated salts (e.g., calcium chloride hexahydrate, calcium bromide hexahydrate, magnesium nitrate hexahydrate, lithium nitrate trihydrate, potassium fluoride tetrahydrate, ammonium alum, magnesium chloride hexahydrate, sodium carbonate decahydrate, disodium phosphate dodecahydrate, sodium sulfate decahydrate, and sodium acetate trihydrate), waxes, oils, water, fatty acids, fatty acid esters, dibasic acids, dibasic esters, 1-halides, primary alcohols, secondary alcohols, tertiary alcohols, aromatic compounds, clathrates, semi-clathrates, gas clathrates, anhydrides (e.g., stearic anhydride), ethylene carbonate, polyhydric alcohols (e.g., 2,2-dimethyl-1,3-propanediol, 2-hydroxymethyl-2-methyl-1,3-propanediol, ethylene glycol, polyethylene glycol, pentaerythritol, dipentaerythritol, pentaglycerine, tetramethylol ethane, neopentyl glycol, tetramethylol propane, 2-amino-2-methyl-1,3-propanediol, monoaminopentaerythritol, diaminopentaerythritol, and tris(hydroxymethyl)acetic acid), polymers (e.g., polyethylene, polyethylene glycol, polyethylene oxide, polypropylene, polypropylene glycol, polytetramethylene glycol, polypropylene malonate, polyneopentyl glycol sebacate, polypentane glutarate, polyvinyl myristate, polyvinyl stearate, polyvinyl laurate, polyhexadecyl methacrylate, polyoctadecyl methacrylate, polyesters produced by polycondensation of glycols (or their derivatives) with diacids (or their derivatives), and copolymers, such as polyacrylate or poly(meth)acrylate with alkyl hydrocarbon side chain or with polyethylene glycol side chain and copolymers including polyethylene, polyethylene glycol, polyethylene oxide, polypropylene, polypropylene glycol, or polytetramethylene glycol), metals, and mixtures thereof.

The selection of a phase change material is typically dependent upon a transition temperature or an application of a fiber that includes the phase change material. A transition temperature of a phase change material typically correlates with a desired temperature or a desired range of temperatures that can be maintained by the phase change material. For example, a phase change material having a transition temperature near room temperature or normal body temperature can be desirable for clothing applications.

The selection of a phase change material can also be dependent upon a phase transition enthalpy of the phase change material. A phase transition enthalpy of a phase change material typically correlates with its ability to regulate heat transfer. In some instances, a phase change material can have a phase transition enthalpy that is at least about 40 J/g, such as at least about 50 J/g, at least about 60 J/g, at least about 70 J/g, at least about 80 J/g, at least about 90 J/g, or at least about 100 J/g. Thus, for example, the phase change material can have a phase transition enthalpy from about 40 J/g to about 400 J/g, such as from about 60 J/g to about 400 J/g, from about 80 J/g to about 400 J/g, or from about 100 J/g to about 400 J/g.

In exemplary embodiments, the phase change material has a phase transition enthalpy of greater than approximately 50 J/g, and most preferably approximately 150 J/g.

In exemplary embodiments, the extruded composition as a whole has a phase transition enthalpy of greater than approximately 60 J/g.

In exemplary embodiments, more than one microencapsulated phase change material may be spun in a singular fiber state such that in place of a single freezing/melting range there are multiple freezing/melting ranges. Loadings of the different materials may vary as desired.

In exemplary embodiments, the polymer comprises the polymer phase of the fiber, which holds the microencapsulated phase change material and additive(s) within the polymer structure. The polymer should be soluble in one or more of the spinning solvents, and insoluble in the quench bath fluid. A wide range of polymers are suitable, including polysulfones, polyimides, polyamide-imides, and polyurethanes. Polymer additives, like polyvinylpyrrolidone, may be used as pore formers and included to allow for additional control over the porosity and pore structure of the polymer phase.

In exemplary embodiments, the solvent comprises such solvents which the phase change material and polymer are both stable in, and the polymer soluble. The solvent phase may also contain multiple solvents, the mixture of which gives desirable solubility of the polymer phase for spinning.

In exemplary embodiments, the above-disclosed additive in the dispersion dope in the disclosed methods, or the additive in the disclosed composition, can comprise one or more of a wide variety of solids that may magnify the heat transfer characteristics of the fiber or augment the properties of the fiber in such a way as it gains usefulness towards some application. One example would be the incorporation of sorbent particles with the phase change material such that the thermal fronts generated in the sorption process are managed, at least in part. Sorbent particles may include, but are not limited to, activated carbons, zeolites, MOFs, and metal oxides, as well as the above listed sorbents enhanced post-synthesis for desired properties (e.g. amine grafting). Activated carbons are highly porous carbonaceous materials with a variety of desirable qualities for adsorption. Zeolites are aluminosilicate materials with high microporosity and a repeating period structure used in adsorption and catalysis for their tunable pore size and surface chemistry. MOFs are a sub-class of porous coordination polymers where metal clusters are joined to one another using organic linkers to form a periodic porous structure. The tunability of different metal(s) and linker allow for an extensive library of porous materials with tunable sorption properties, ideal for gas and liquid separation and storage.

In exemplary embodiments of an extruded composition containing such one or more additives, the combined weight fraction of the additive and phase change material is greater than approximately 50%, more preferably greater than approximately 60%, and most preferably greater than approximately 70%.

Depending on the length or amount of a sample of the present composition, in exemplary embodiments, the extruded composition/fiber would be considered a heterogeneous mixture of polymer, microencapsulated phase change material, and in some embodiments additives, formed through the spinning process into a fiber morphology. Depending on the length or amount of a sample of the present composition, in exemplary embodiments, the extruded composition/fiber would be considered a homogeneous mixture of polymer, microencapsulated phase change material, and in some embodiments additives, formed through the spinning process into a fiber morphology.

The fiber diameter can be controlled through the spinning process, as desired, for example from less than 100 nm to 2 mm. The porosity of the fiber can be controlled by a combination of spinning conditions and dope composition. The extruded composite may be multilayered, with different compositions in different layers. A bore may also be introduced into the fiber as desired, through the introduction of a bore fluid extruded through the center of the extrudate.

In exemplary embodiments, the fiber extrudate may be treated after completion of solvent exchange and drying steps to provide additional desirable properties. One example would be coating the exterior of the fiber with additional microencapsulated phase change materials to reach even higher loadings.

In exemplary embodiments, the extruded composition/fiber travels through the air gap and some of the solvent may evaporate from the extruded composite. In addition, the air gap allows the polymer composite extrudate to be drawn through a quench bath, such that the draw ratio (ratio of draw speed and extrudate flow rate from the spinnerets) may give additional control over the diameter of the fiber. The spinneret's temperature and height relative to the quench bath may be manipulated to control some structural and microstructural properties of the fiber.

In exemplary embodiments, the quench bath comprises water or other solvent(s) in which the polymer is not soluble, and the filament from the spinnarette is drawn through the bath, exchanging solvent such that the polymer begins to solidify. Non-solvents (solvents the polymer is not soluble in) could be used for the quench bath(s), although it presents health and safe issues. This would be significantly more expensive and environmentally hazardous, but for some (potentially extremely desirable) sorbent systems it may be required. The quench bath temperature may be varied, for example from below room temperature to approaching the boiling point of the solvent in the bath, though not reaching it, as the temperature of the bath can impact the microstructure of the fiber.

In exemplary embodiments, the solvent exchange process can comprise the long-term soaking of the formed fiber composites in solvent to complete the phase change of the polymer(s) in the composite to the solid phase and remove any excess solvent. The solvent exchange can be one or many steps depending on the necessity to stabilize the pore structure.

Micrographs illustrate well the present wet-spin dry jet spinning of Microencapsulated Phase Change Material (μPCM). FIGS. 1-13 are SEM images, beginning with a few example μPCM's and μPCM structure after exposure to solvent and vacuum conditions that are expected or required in the spinning process.

Figure 1:
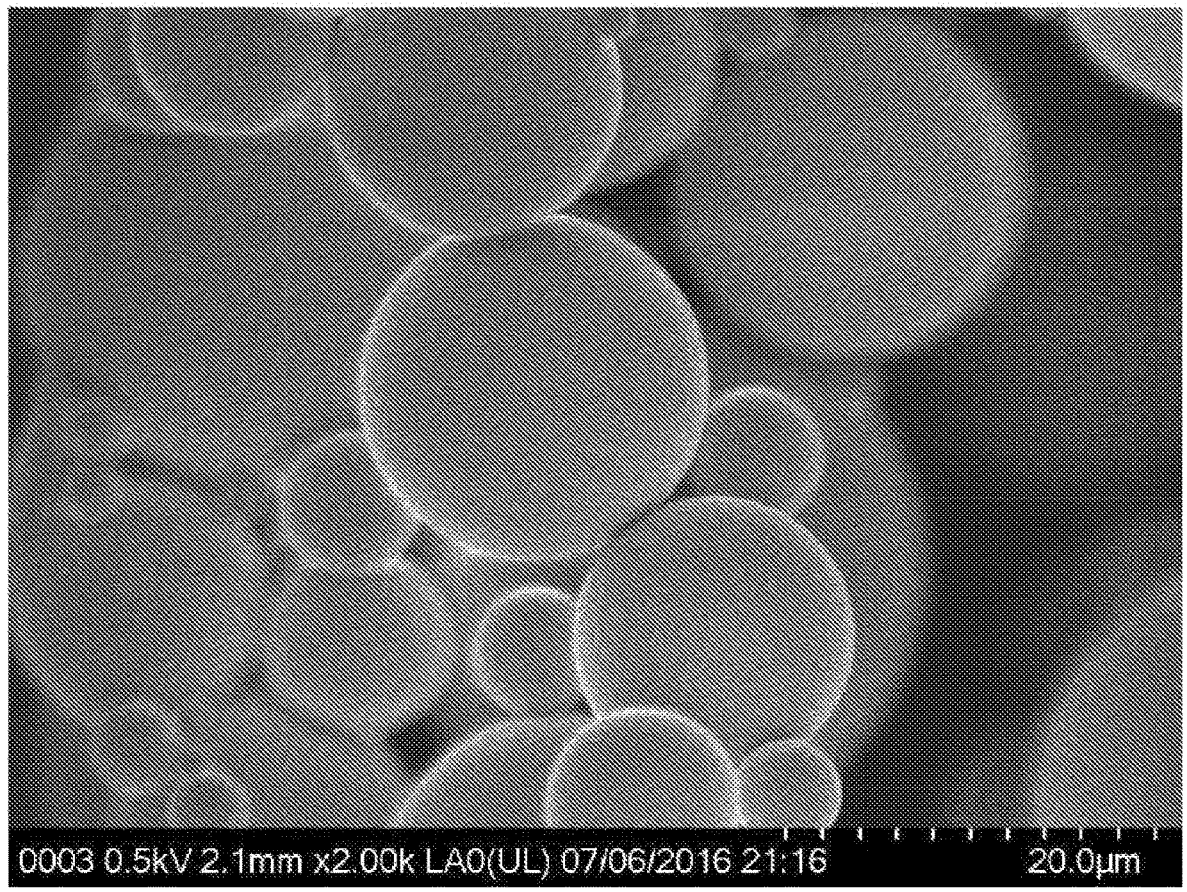
FIG. 1. Image of normal microencapsulated phase change materials as received from MicroTek.
Figure 2:
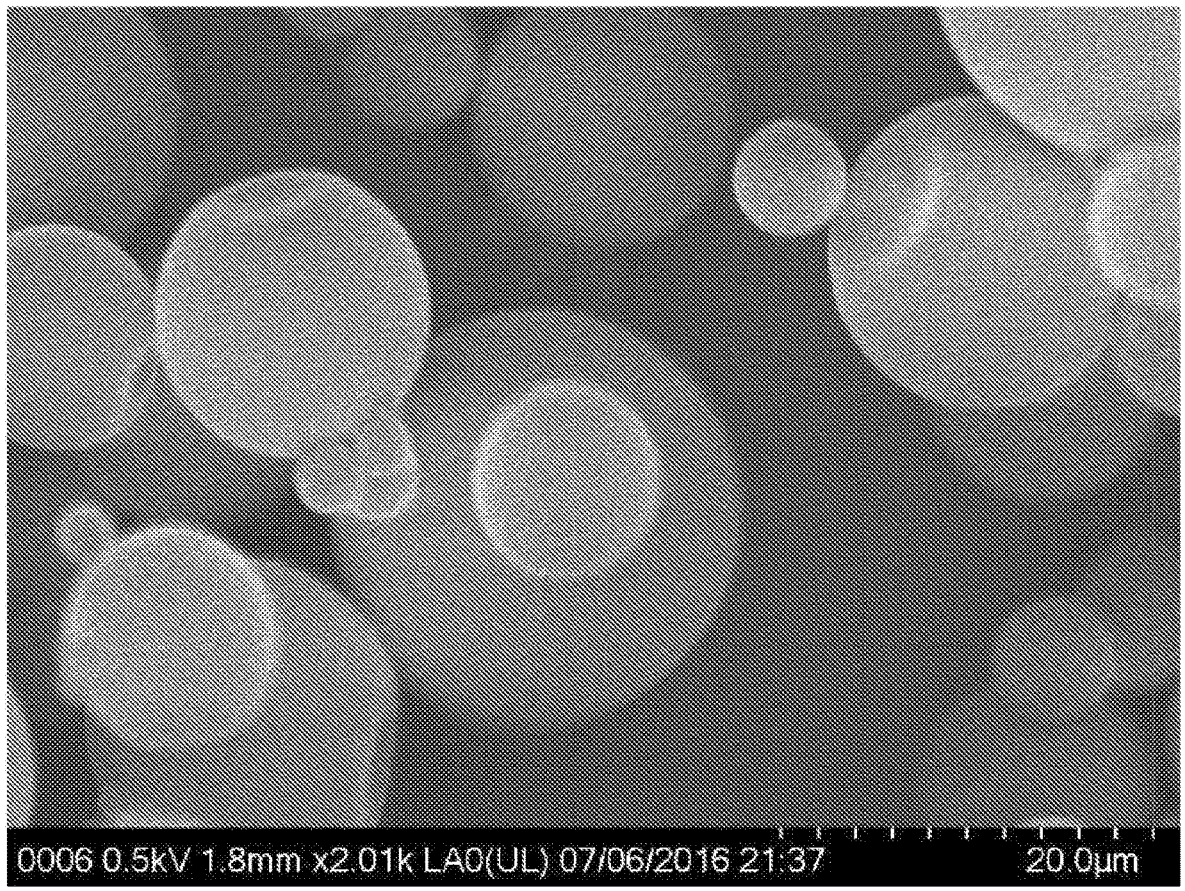
FIG. 2. Images of microencapsulated phase change materials after one day exposure to N-methyl-pyrrildone (NMP). NMP is the main solvent used in the spinning process for polymer incorporation.
Figure 3:
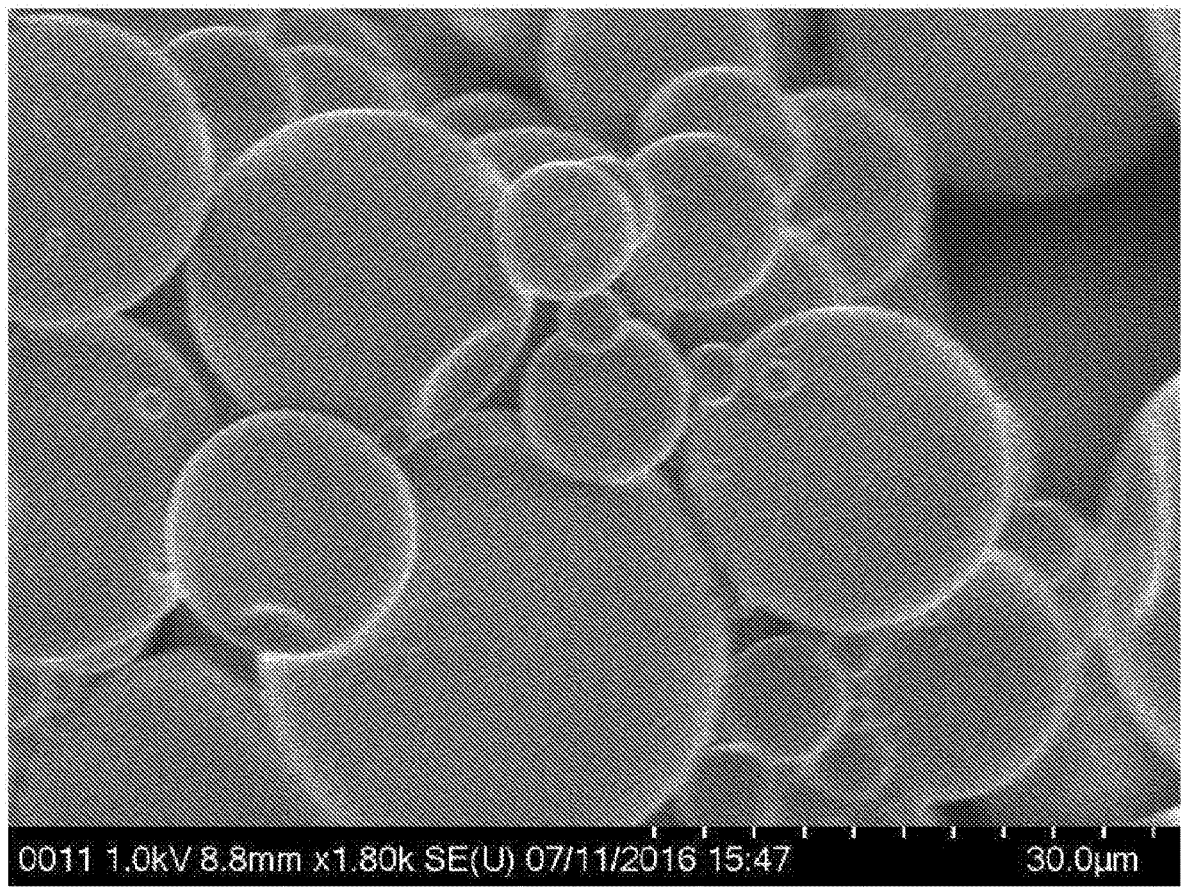
FIG. 3. Images of microencapsulated phase change materials after four hours under elevated temperatures (80 degrees Celsius, vacuum). The same divetting as noted in FIG. 2 offers the likelihood the encapsulant wasn't affected by the soak in NMP so much as the drying in vacuum.
Figure 4:
FIG. 4. Low magnification SEM image of microencapsulated phase change materials incorporated into a cellulose acetate fiber. Fibers produced via syringe extrusion, a less automated approach to wet-spin dry-jet spinning of the present invention.
Figure 5:
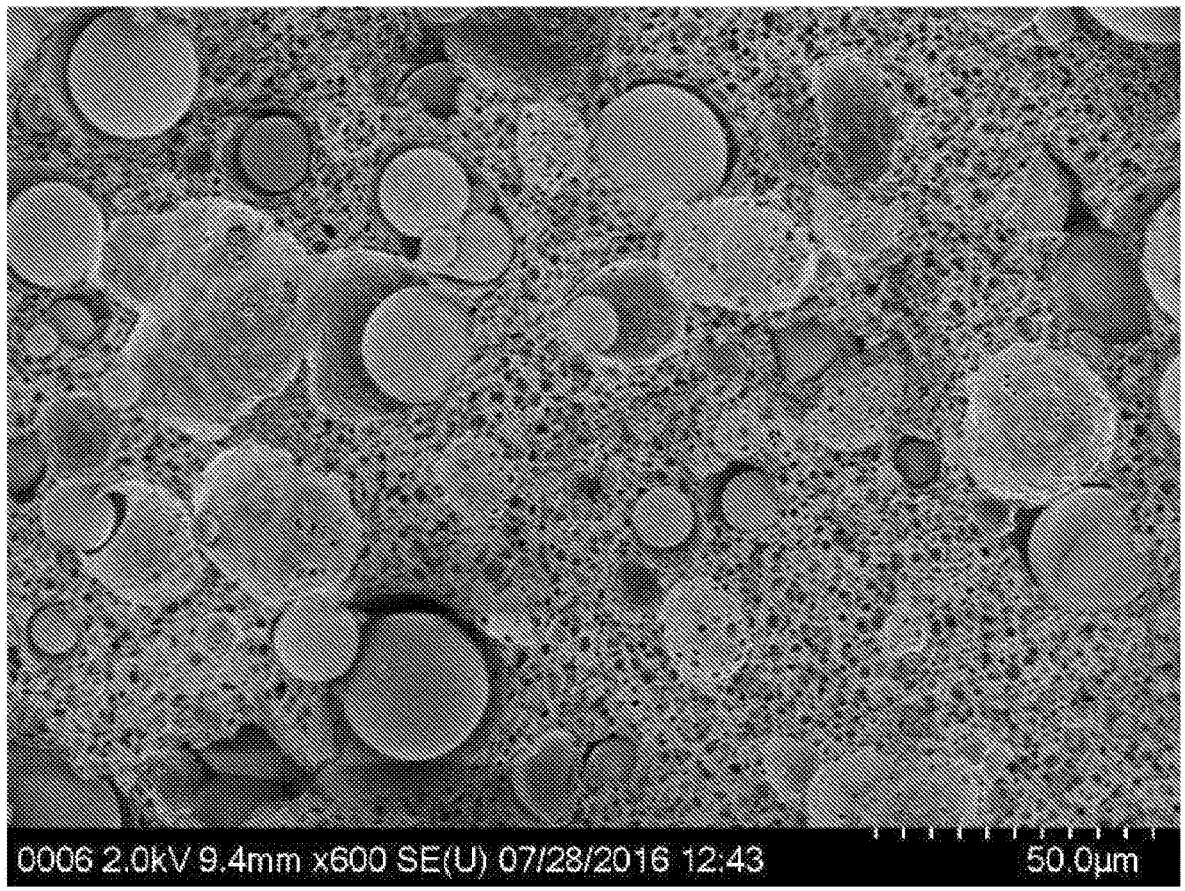
FIGS. 5-7. Images of microencapsulated phase change materials incorporated into a fiber produced through wet-spin dry jet technique. μPCM loading is a weight fraction of 50% as confirmed by differential scanning calorimetry. No structural damage is noted in the microencapsulated material.
Figure 6:
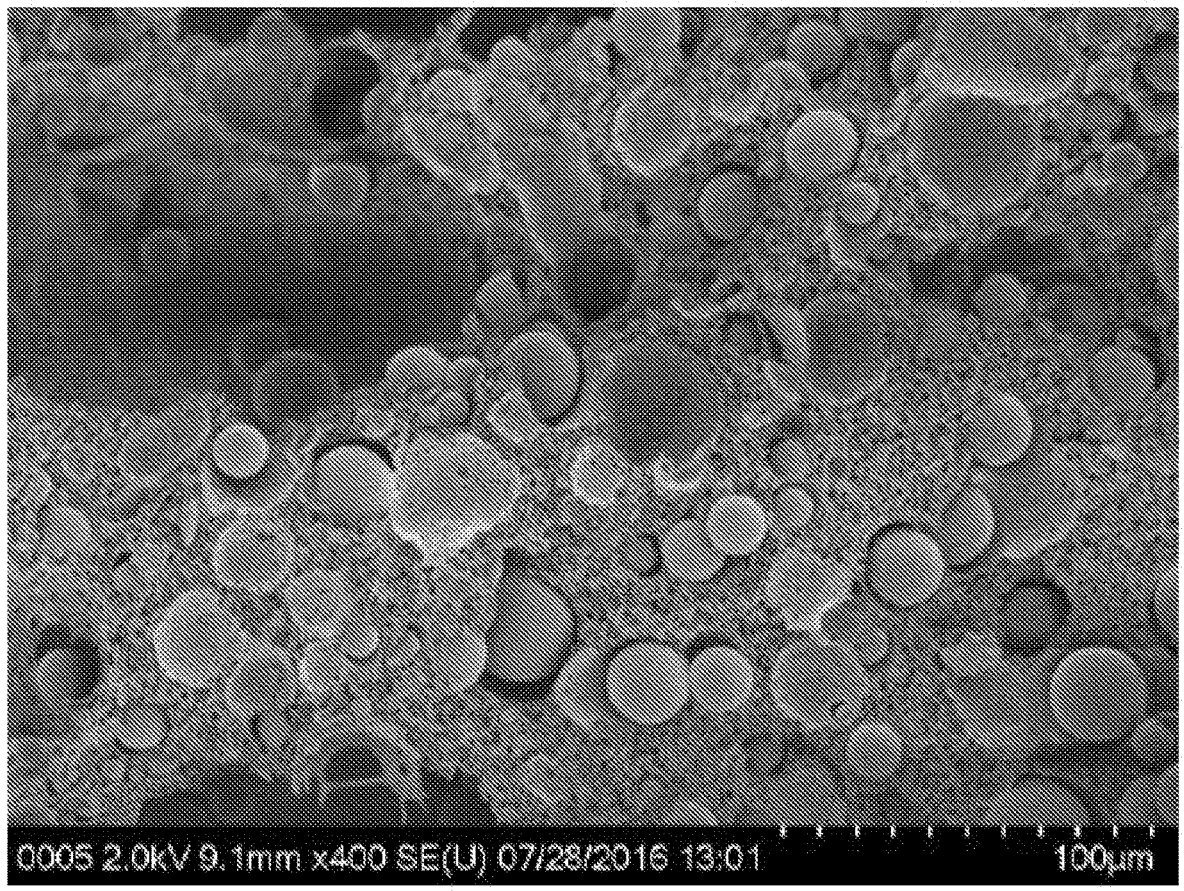
Figure 7:
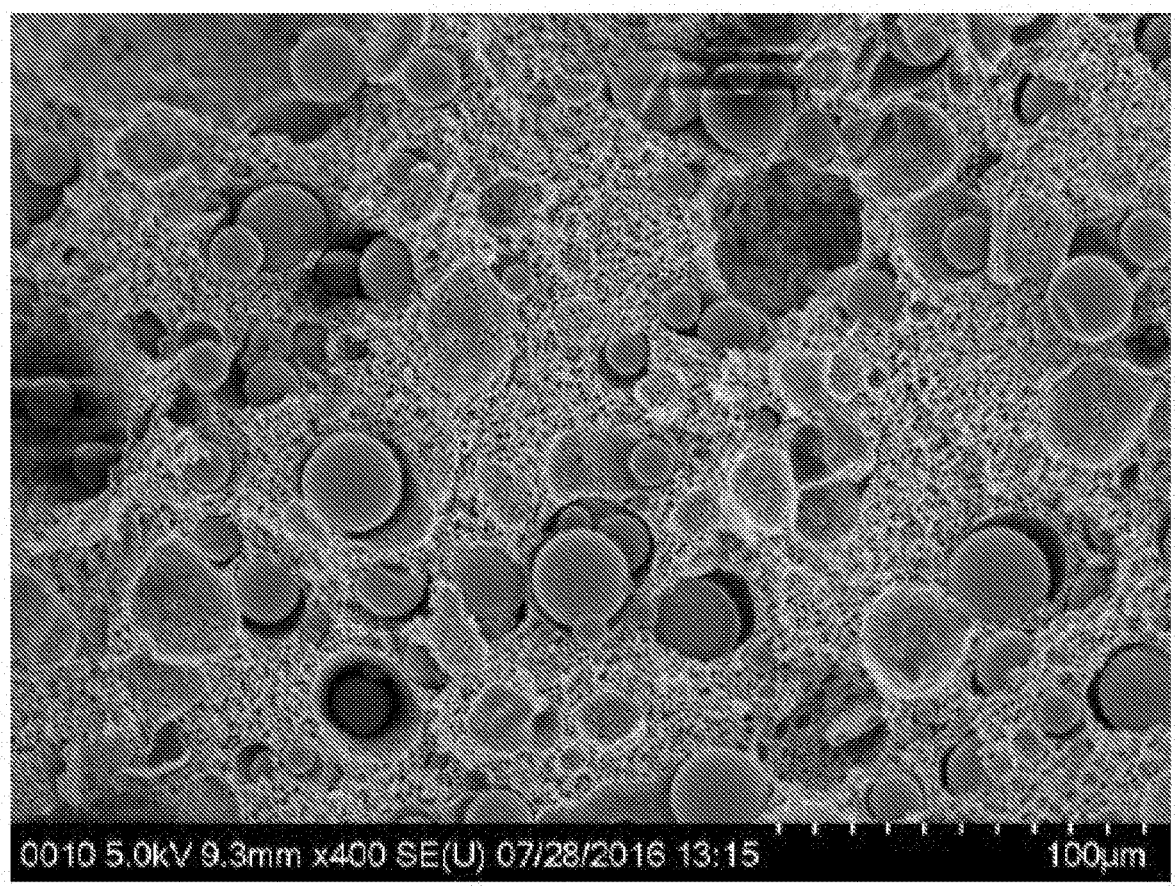
Figure 8:
FIG. 8. Low magnification SEM image of microencapsulated phase change materials incorporated into a cellulose acetate fiber with μPCM loading at a weight fraction of 75%.
Figure 9:
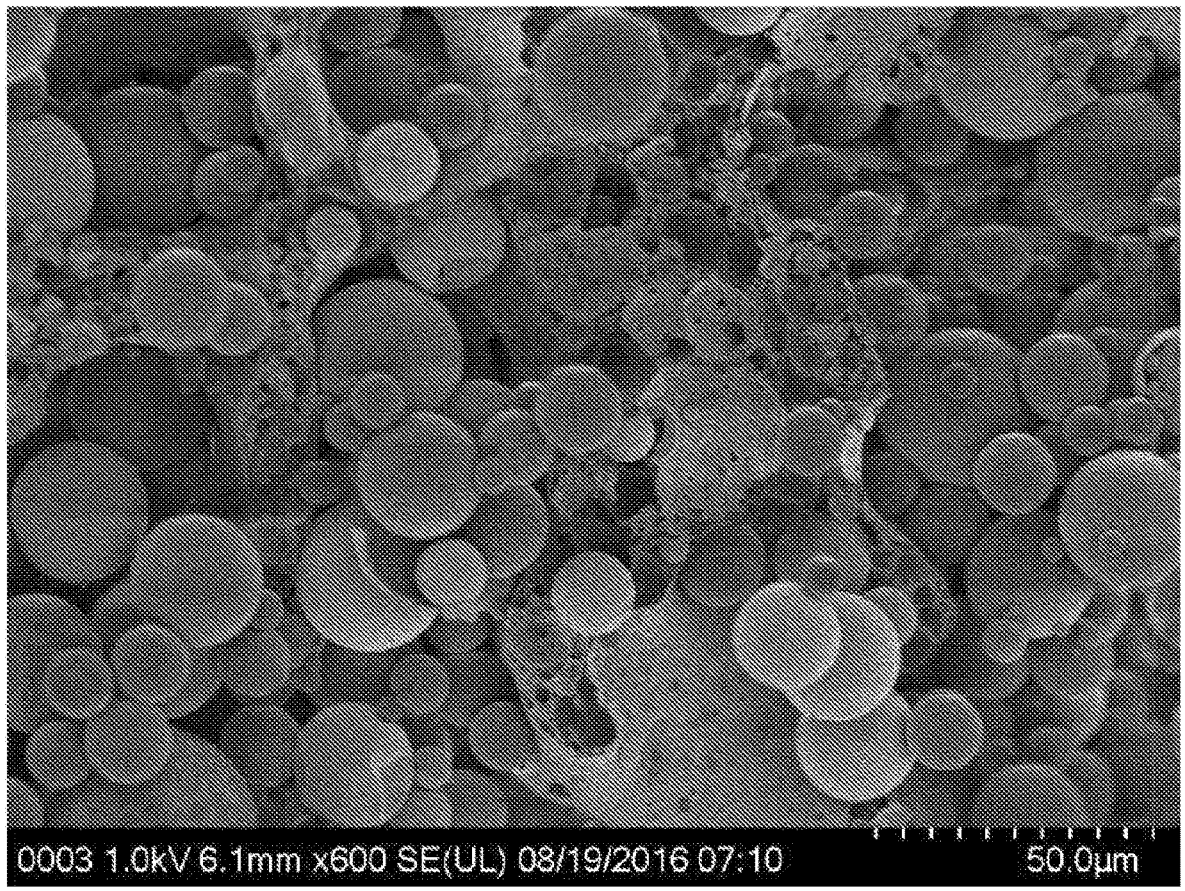
FIG. 9. Zoomed in SEM image of FIG. 8, a weight fraction of 75% microencapsulated phase change material/cellulose acetate fibers.
Figure 10:
FIG. 10. Image of microencapsulated phase change material and metal-organic-framework (adsorbent) spun fiber at low magnification. The microencapsulated phase change materials survive with some divetting (explained by the use of vacuum for 12 hours to dry the fibers.
Figure 11:
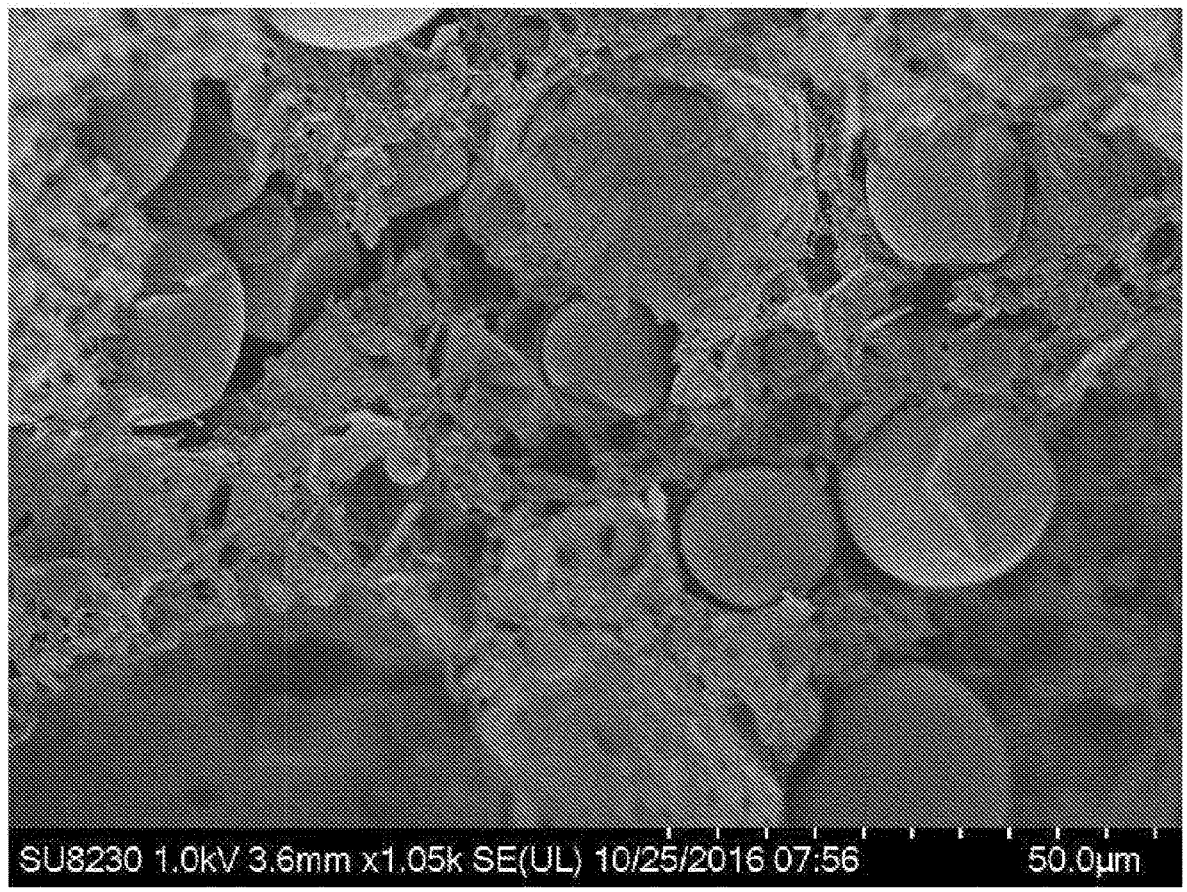
FIG. 11. Zoomed in SEM image of microencapsulated phase change material/MOF (UiO-66) fibers prepared using wet-spin dry jet process. Note sorbent is right next to phase change material.
Figure 12:
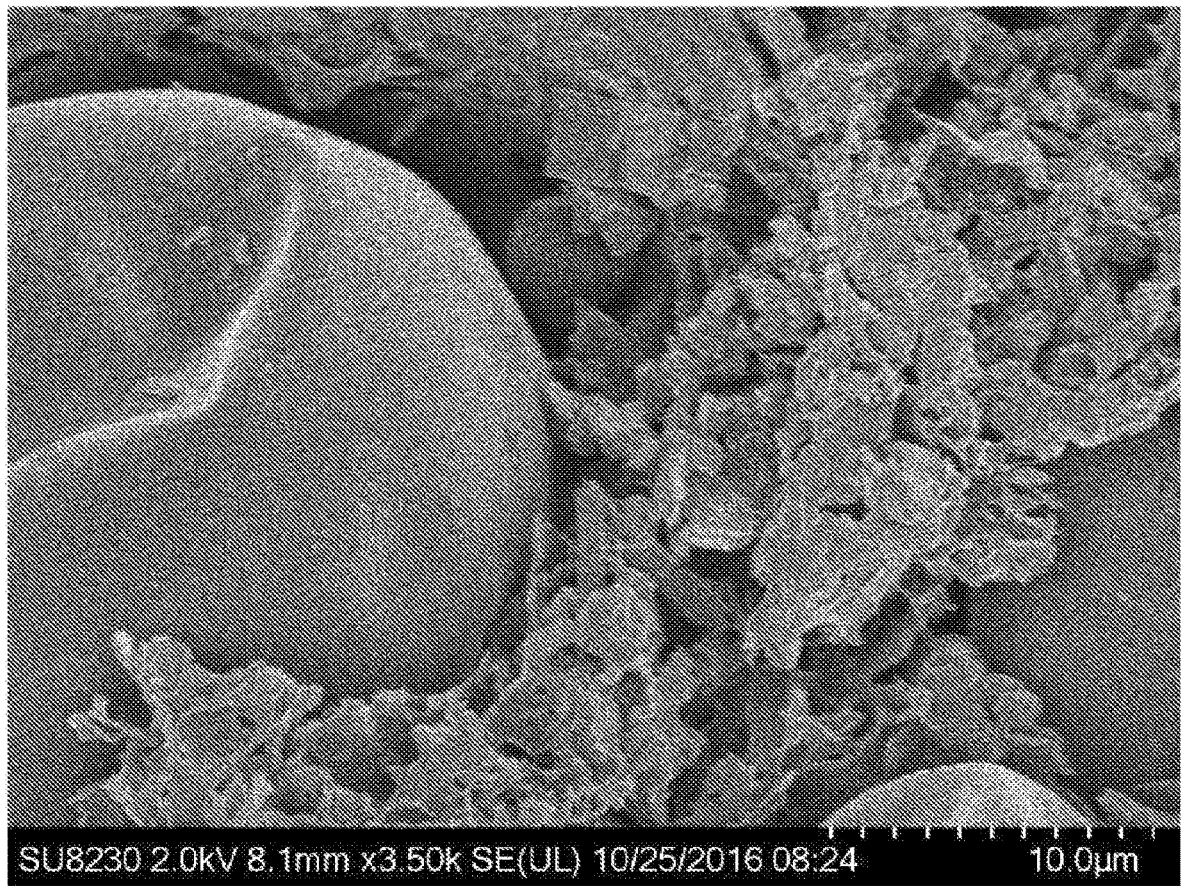
FIG. 12. Similar to FIG. 11, focused further on the microencapsulated phase change material/polymer interface and how close the sorbent (the sharp structures) are able to get to the phase change material.
Figure 13:
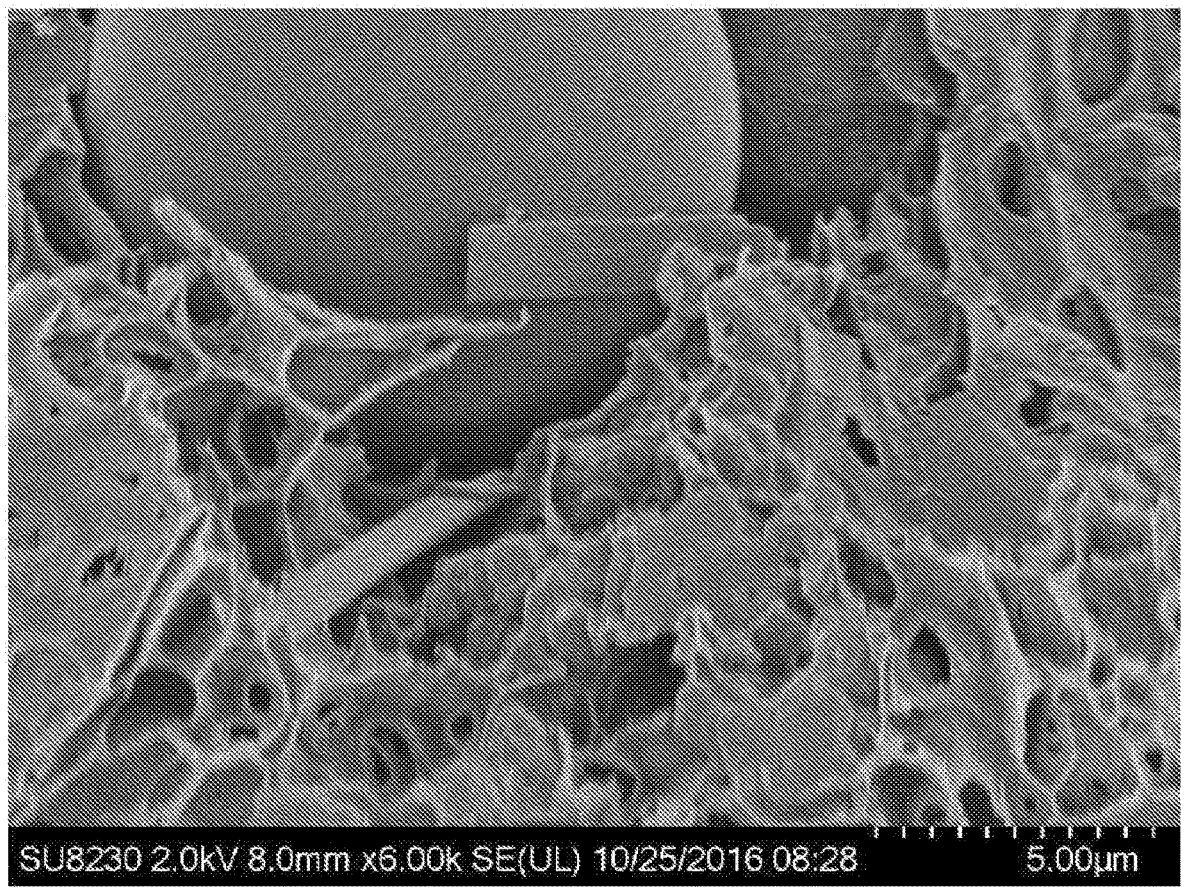
FIG. 13. Similar to FIG. 12, focused on a different microencapsulated phase change material.

The spinning of μPCM's at 50% weight fraction of the fiber are shown in FIGS. 4-7, at a weight fraction of 75% (highest recorded fiber loading in the literature) in FIGS. 8-9, and at lower weight fraction (around 35%), but with the inclusion of sorbent particles UiO-66 in FIGS. 10-13.

Figure 14:
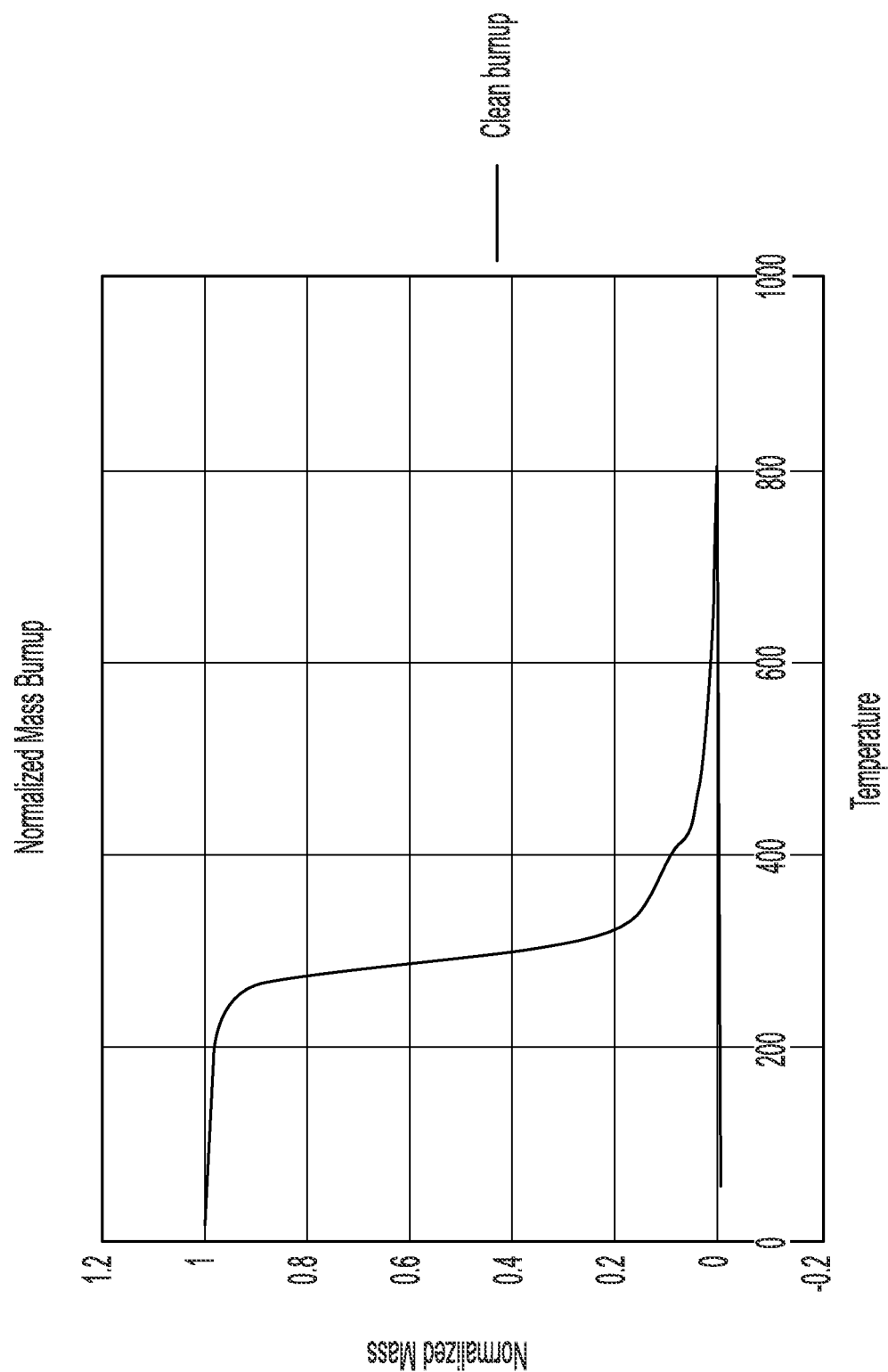
FIG. 14. Graph of thermal gravimetric analysis (TGA) of microencapsulated phase change material decomposition. All mass is lost after two separate decompositions, one starting around 220° C. (attributed to the internal phase change material, and a second around 400° C. explained as the encapsulating agent decomposing.
Figure 15:
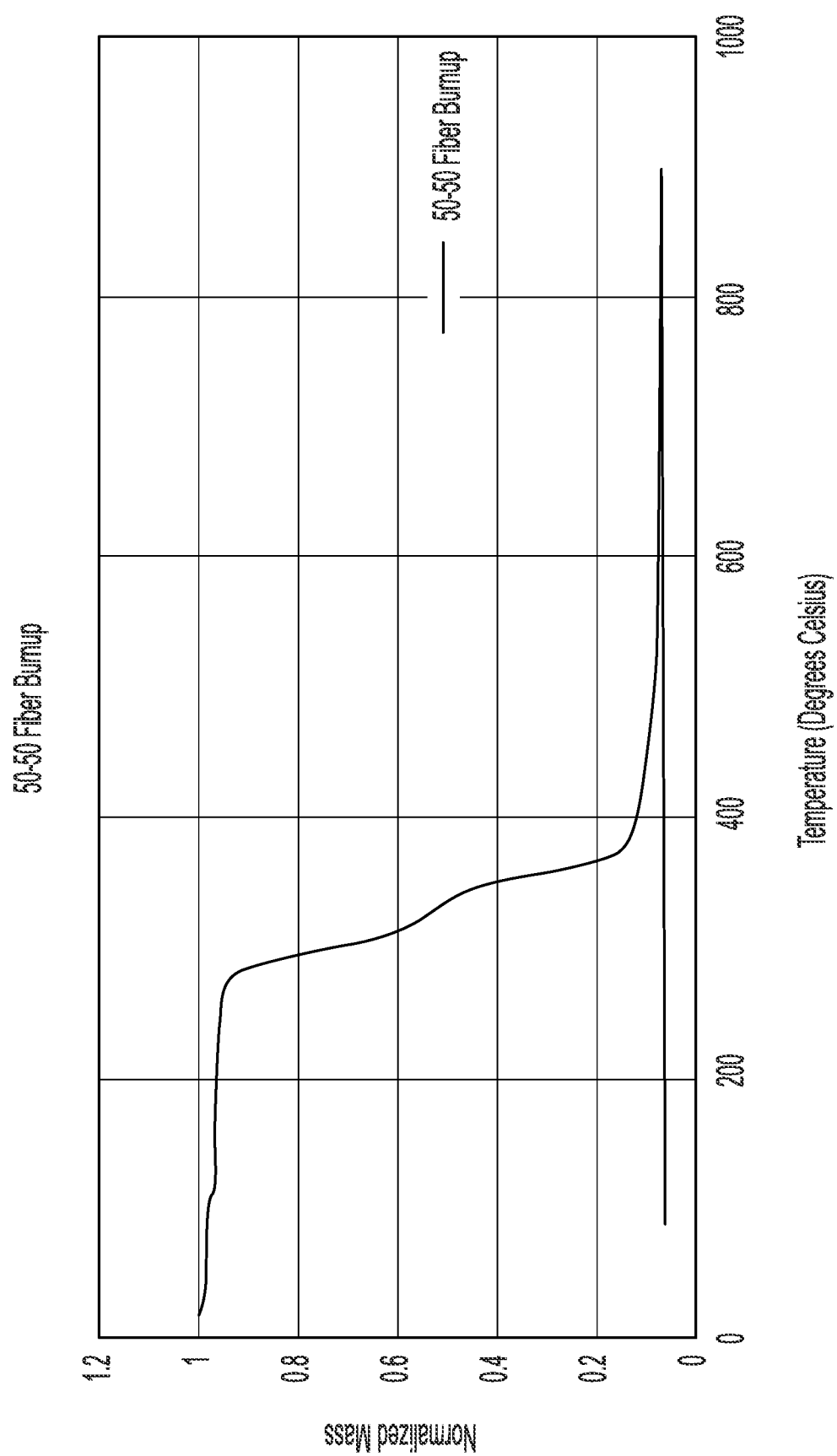
FIG. 15. Graph of thermal gravimetric analysis of microencapsulated phase change material fibers. Three decompositions are noted, the two mentioned in FIG. 14. for the microencapsulated phase change material, as well as one for the decomposition of the fiber material (cellulose acetate). This result, combined with that shown in FIG. 16 (below) shows that TGA cannot be used to determine weight loading of microencapsulated phase change materials when they are spun into fiber contactors.
Figure 16:
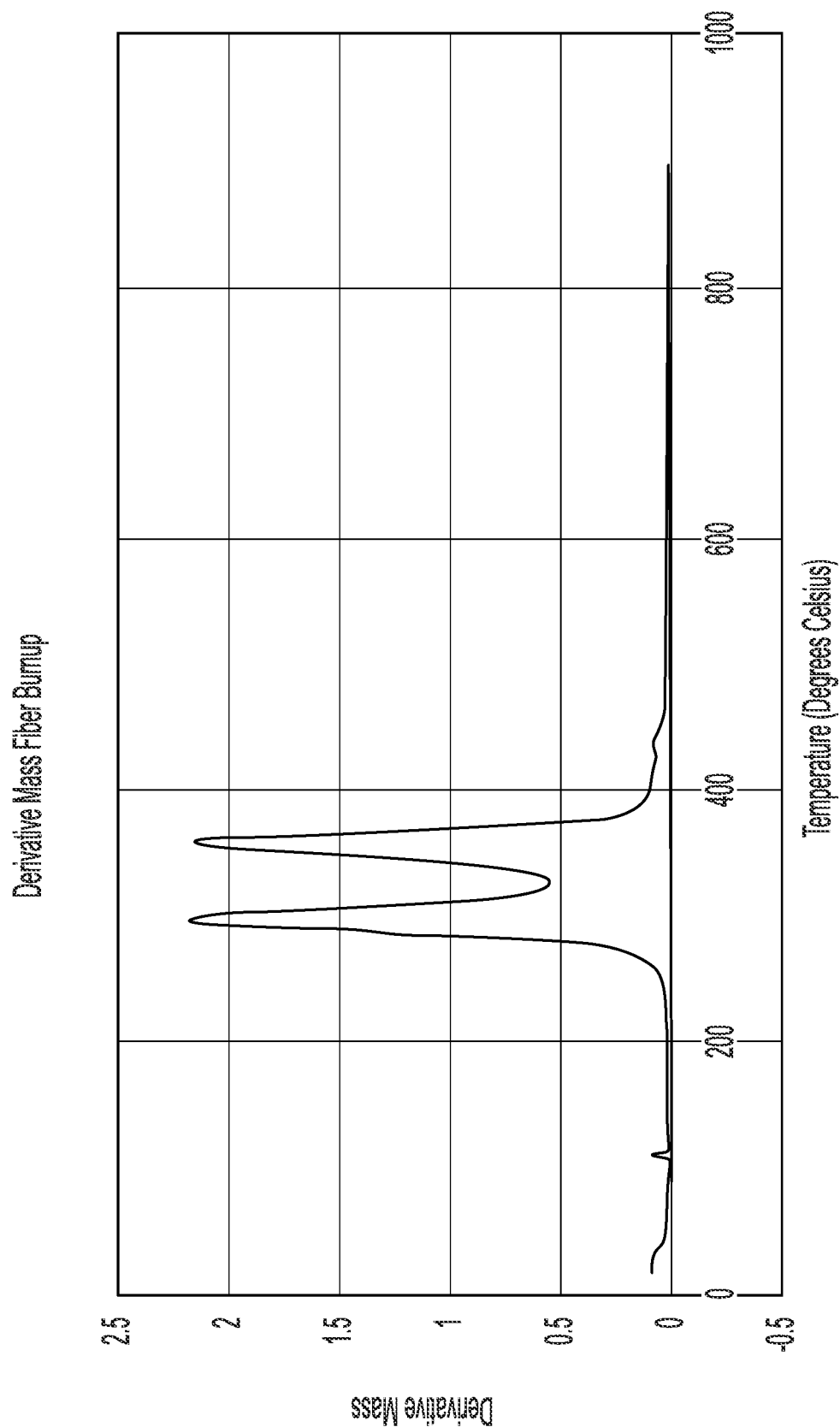
FIG. 16. Graph of thermal gravimetry analysis of microencapsulated phase change material into fibers, looking at the derivative of mass change as a function of time versus temperature. Two large peaks (starting at 220° C., peaking at 240° C. and starting at 310° C. peaking at 330° C.) are noted. Because the derivative does not reach zero between the two decomposition peaks it is not possible to deconvolute mass which is attributable to the microencapsulated phase change material from the decomposition of the fiber.
Figure 17:
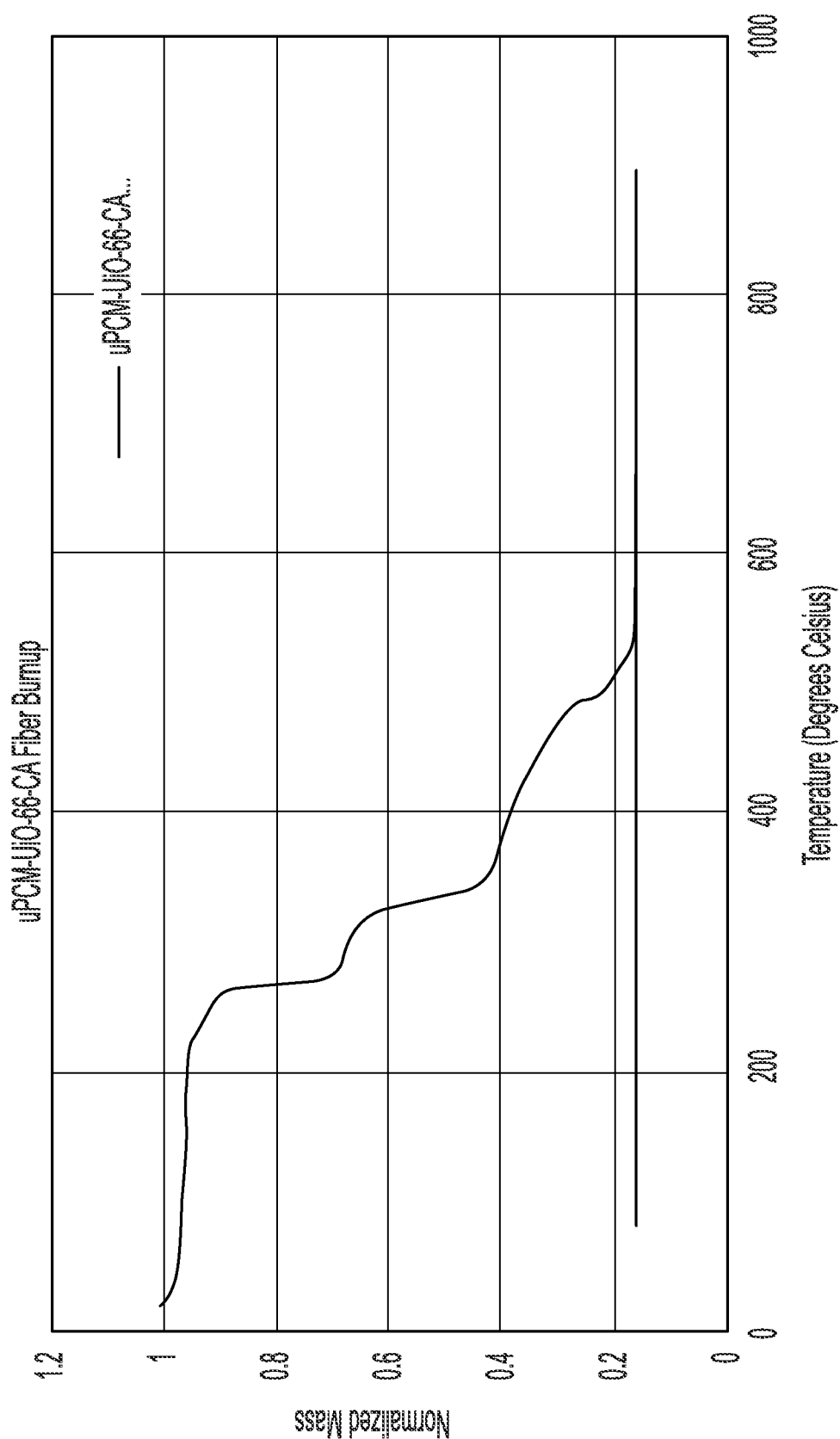
FIG. 17. Graph of thermal gravimetric analysis of microencapsulated phase change material/UiO-66 (a MOF which has been shown to be spinnable)/cellulose acetate fibers. All expected peaks are shown for the microencapsulated phase change materials, as well as the decomposition of the UiO-66 organic materials, the cellulose acetate, and the remaining mass of the oxidized metal species left over from the burnup of the MOF in the fiber. These fibers had a target mass loading of 35% MOF, 38% μPCM, with a balance being cellulose acetate. This analysis shows about 37% MOF, calculated from the remaining mass of metal oxide to determine MOF loading. This is in good agreement within reasonable error.

Thermogravimetric analysis is reported in FIG. 14 as explanation of the weight distribution of the μPCM themselves, along with them in the fiber in FIGS. 15-16. These figures show that TGA cannot be used to determine weight loading of μPCM in Cellulose Acetate fibers due to overlapping thermal decomposition temperatures. FIG. 17 shows that although weight fraction cannot be supported for the μPCM using TGA it still can be used to determine weight loading of sorbent particles. FIGS. 18-21 offer Differential Scanning Analysis (DSC) which can be used to characterize the phase change behavior of the µPCM. Most important here is that DSC can support the theoretical weight loading of the fibers as well as proving that the µPCM survives the spinning process enough so that they can still perform their expected task, absorbing/giving off heat at target temperatures of phase transition.

Overall the following figures and descriptions show the successful spinning and characterize hybrid µPCM-polymer and µPCM-sorbent-polymer fibers produced using the present wet-spin dry-jet technique, that the µPCM survives the spinning process, and retain their ability to act as heat sink/sources at target temperatures.

The present inventive process and fiber composition can be incorporated into, for example, a $CO_2$ capture system. In such environments, flexibility in the choice of sorbent is important, as while an MOF (UiO-66) has been tested, materials with much higher swing capacities can be incorporated into the present invention.

The combination of high swing capacities and rapid cycling of the bed make the management of thermal fronts a key engineering challenge to a $CO_2$ capture process. Thermal front management, allowing for near isothermal operation in the bed, allows for higher purity and recovery of the $CO_2$ product, as well as more and efficient sorbent utilization.

In an earlier approach, incorporation of phase change material was into the bore of a fiber sorbent. The present new approach of direct spinning of microencapsulated phase change material (µPCM) with sorbent into a composite fiber sorbent is easier to manufacture and scale while retaining all the benefits of the previous approach.

Microencapsulated phase change materials are small capsules (~20 µm in diameter) with a polymeric shell and phase change material in the core, which selectively freezes and melts at a desired temperature range. An example of a µPCM is shown in FIG. 22(a). The encapsulating polymer effectively contains the phase change materials enclosed in the same way a barrier layer would hold the phase change material in the bore of the fiber. Therefore, as long as µPCM can be spun into the fiber sorbent platform, the post-spinning installation of barrier layers would not be necessary.

Observing this possible manufacturing benefit, the direct spinning of µPCM with the MOF UiO-66 was examined. Dopes were prepared in a similar manner to spinning of fiber sorbents, and cellulose acetate-µPCM-UiO-66 fibers were spun, and an SEM image of a cross section of one such fiber is shown in FIG. 22(b). After solvent exchange and drying, the fibers' loadings of UiO-66 and µPCM were confirmed via thermogravimetric analysis and differential scanning calorimetry, respectively, which showed the MOF and µPCM both survived the spinning process. Thus, phase change material was successfully integrated into the fiber sorbents.

With the thermally modulated fiber sorbents successfully manufactured, the composite (µPCM-containing) fiber sorbent performance in the sub-ambient rapidly cycled pressure swing adsorption (RCPSA) was explored. Sub-ambient breakthrough experiments were performed to explore the performance benefits of the thermally modulated fiber sorbents, the results of which are shown in FIG. 23-24. Critically, when the phase change material is active in the fibers (i.e., close to the melting point), the sorbent breaks with higher capacity at low loadings indicative of sharper breakthrough performance.

One method of characterizing how isothermal a sorbent is being kept is to look at the capacity of the sorbent at low leakage. The more isothermal the bed is kept, the "sharper" the breakthrough appears, and with it the higher the capacity of the sorbent. Reported in FIGS. 23-24 are the capacities of the sorbent (UiO-66) at 5% leakage. When the µPCM is active, as in the case at 238 K, the capacity of the sorbent is higher, indicative of a sharper breakthrough. The sharper the breakthrough (and by extension more isothermal the bed kept), the higher purity the system can reach with similar recovery, and the sorbent will be used more efficiently. When the µPCM is inactive, as when it is operated well below its melting point, there is no discernable effect on sorbent capacity, as expected.

The present method of incorporating phase change materials greatly simplifies the production of composite fiber sorbents, as it eliminates the requirement to install a lumen layer and then the µPCM into the fibers post spinning (i.e., two steps are removed). The encapsulated nature of the µPCM means each pouch of µPCM has its own lumen layer already installed when directly spun.

Finding a sorbent material capable of 10 mmol/g swing capacity is a key component of driving down the cost of $CO_2$ capture for our proposed process. By cooling the flue gas and operating at sub-ambient conditions, the present invention can reach extremely massive swing capacities. The use of UiO-66 or some linker-functionalized form of that MOF had been investigated. FIGS. 25-27 show the swing capacity as a function of temperature for a variety of UiO-66 constituents with different functionalized linkers. Linker functionalization reduces swing capacity as the functionalized form of the MOF reduces the pore volume, and by extension the equilibrium capacity of the MOF. Introducing missing linker defects into the structure of the UiO-66 has been explored, which showed minimal increase in swing capacity for UiO-66.

The potential for alternative MOFs was computationally investigated. From this analysis, more than 20 MOFs were determined to exhibit desired swing capacities over the desired temperature range, and >80 MOFs exhibited these swing capacities for at least one combination of conditions. MIL-101(Cr) is a MOF known to be water stable and exhibits the desired capacities. To benchmark UiO-66 against another water stable MOF, the water stability of MIL-101(Cr) has been synthesized, collected isotherms, and characterized.

The collected adsorption isotherm for MIL-101(Cr) is shown in FIGS. 28-29, exhibiting >10 mmol/g swing capacity when operated below −40° C. swinging between 0.1 bar and 2 bar partial pressure $CO_2$. Also, in FIGS. 28-29 is the simulated selectivity of $CO_2$ over $N_2$ as a function of operating pressure, showing very high selectivity of $CO_2$ over $N_2$ at low pressures and high temperatures. MIL-101 (Cr) appears to be an excellent candidate MOF for the proposed $CO_2$ capture process. It is believed these high capacities will be required for an economical $CO_2$ capture process, as higher capacity directly reduces the amount of sorbent required to capture $CO_2$ at the target rates and recoveries.

MIL-101(Cr) has shown to be water stable, making it viable for fiber sorbent spinning. With this viability in mind, vetting the performance of MIL-101(Cr) on a small scale as a "proof of concept" has been undertaken. Looking at their surface areas, it appears as though MIL-101(Cr) retains its permanent porosity even after exposure to humid $SO_2$. Powder XRD was performed before and after exposure and shows no major differences, indicative of crystal structure stability. Continued analysis of acid gas stability of MIL-101(Cr) is ongoing to ensure stability at desired conditions.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A porous extruded composition comprising:
a phase change material;
a metal-organic framework (MOF); and
a polymer;
wherein the porous extruded composition has a swing capacity of greater than 2 mmol/g;
wherein the phase change material has a phase transition enthalpy of greater than approximately 50 J/g; and
wherein the porous extruded composition has a phase transition enthalpy of greater than approximately 60 J/g.

2. The porous extruded composition of claim 1, wherein:
the porous extruded composition is a wet-spin dry-jet fiber; and
the phase change material comprises a microencapsulated phase change material.

3. The porous extruded composition of claim 1, wherein:
the polymer has a weight fraction from approximately 20% to approximately 50%;
the phase change material comprises a microencapsulated phase change material; and
the weight fraction of the microencapsulated phase change material is greater than approximately 60%.

4. The porous extruded composition of claim 1, wherein the phase change material comprises a microencapsulated solid-liquid phase change material; and
wherein the microencapsulated solid-liquid phase change material is encapsulated by a barrier layer that effectively contains the phase change material during repeated freeze/melt cycles.

5. The porous extruded composition of claim 1, wherein the phase change material comprises a solid-solid phase change material.

6. The porous extruded composition of claim 1, wherein:
the phase change material comprises a microencapsulated phase change material having a diameter of from approximately 70 nm-100 μm; and
a maximum distance from the MOF to the microencapsulated phase change material is 1 μm.

7. The porous extruded composition of claim 1, wherein the phase change material comprises two or more microencapsulated phase change materials of different composition.

8. A wet-spin dry-jet fiber formed by a wet-spin dry-jet technique from a dispersion dope comprising a microencapsulated phase change material and a first portion of solvent, a prime dope comprising a first portion of a polymer and a second portion of the solvent comprising:
the microencapsulated phase change material;
a metal-organic framework (MOF); and
the polymer;
wherein the fiber has a $CO_2$ swing capacity of greater than 2 mmol $CO_2$/g;
wherein the microencapsulated phase change material has a phase transition enthalpy of greater than approximately 50 J/g;
wherein the microencapsulated phase change material is encapsulated by a barrier layer that effectively contains the phase change material during repeated freeze/melt cycles;
wherein the fiber has a phase transition enthalpy of greater than approximately 60 J/g;
wherein the fiber has a morphology based on the effective heat transfer distance from the MOF to the microencapsulated phase change material of 1 μm or less; and
wherein porosity of the fiber is controllable to a sufficient porosity via spinning conditions of the wet-spin dry-jet technique and one or more of the dispersion dope composition, the prime dope composition, and the fiber composition, such that with the sufficient porosity, the microencapsulated phase change material is integrated throughout the MOF resulting in a swing capacity of the MOF of greater than 10 mmol/g.

9. An extruded composition comprising a phase change material, a metal-organic framework (MOF), and a polymer having a weight fraction from approximately 20% to approximately 50%, wherein the extruded composition forms a single elongated volume defined as that portion of the extruded composition contained within an exterior surface, wherein the extruded composition is configured such that upon a phase transition of a phase transition portion of the phase change material, the phase transition portion of the phase change material remains in the single elongated volume, wherein at least a portion of the phase change material has a phase transition enthalpy of greater than approximately 50 J/g, wherein the single elongated volume has a phase transition enthalpy of greater than approximately 60 J/g, wherein the extruded composition has a swing capacity of greater than 2 mmol/g, and wherein the weight fraction of the phase change material in the single elongated volume is greater than approximately 60%, the extruded composition formed by a wet spinning-dry jet spinning process comprising:
providing a dispersion dope comprising the phase change material, the MOF, and a first portion of a solvent;
providing a prime dope comprising a first portion of the polymer and a second portion of the solvent;
forming an extrusion composition comprising the dispersion dope, the prime dope and a second portion of the polymer;
extruding the extrusion composition; and
quenching the extruded composition;
wherein porosity of the extruded composition is controllable via spinning conditions and one or more of the dispersion dope composition, the prime dope composition, and the extruded composition.

10. An extruded composition comprising:
a microencapsulated phase change material;
a metal-organic framework (MOF); and
a polymer;
wherein the extruded composition has a swing capacity of greater than 2 mmol/g;
wherein the polymer has a weight fraction from approximately 20% to approximately 50%; and
the weight fraction of the microencapsulated phase change material is greater than approximately 60%.

11. The extruded composition of claim 10, wherein the MOF has a swing capacity of greater than 10 mmol/g.

12. The extruded composition of claim 10, wherein the MOF has a swing capacity of greater than 2 mmol/g.

13. The extruded composition of claim 10, wherein the MOF has a swing capacity of greater than 5 mmol/g.

14. The extruded composition of claim 12, wherein the MOF comprises UiO-66.

15. The extruded composition of claim 13, wherein the MOF comprises UiO-66.

16. A porous extruded composition comprising:
a phase change material;
a metal-organic framework (MOF); and
a polymer;
wherein the porous extruded composition has a swing capacity of greater than 2 mmol/g.

17. The porous extruded composition of claim 16, wherein the MOF has a swing capacity of greater than 2 mmol/g.

18. The porous extruded composition of claim 16, wherein the MOF has a swing capacity of greater than 6 mmol/g.

19. The porous extruded composition of claim 16, wherein the porous extruded composition has a phase transition enthalpy of greater than approximately 60 J/g; and
wherein the phase change material has a phase transition enthalpy of greater than approximately 50 J/g.

20. The porous extruded composition of claim 16, wherein the MOF comprises UiO-66.

21. The porous extruded composition of claim 20, wherein the MOF has a swing capacity of greater than 5 mmol/g.

22. A wet-spin dry-jet fiber formed by a wet-spin dry-jet technique from a dispersion dope comprising a microencapsulated phase change material and a first portion of solvent, a prime dope comprising a first portion of a polymer and a second portion of the solvent comprising:
the microencapsulated phase change material;
a metal-organic framework (MOF); and
the polymer;
wherein the microencapsulated phase change material has a phase transition enthalpy of greater than approximately 50 J/g;
wherein the microencapsulated phase change material is encapsulated by a barrier layer that effectively contains the phase change material during repeated freeze/melt cycles;
wherein the fiber has a phase transition enthalpy of greater than approximately 60 J/g;
wherein the fiber has a $CO_2$ swing capacity of greater than 2 mmol $CO_2$/g;
wherein the fiber has a morphology based on the effective heat transfer distance from the MOF to the microencapsulated phase change material of 1 μm or less; and
wherein porosity of the fiber is controllable via spinning conditions of the wet-spin dry-jet technique and one or more of the dispersion dope composition, the prime dope composition, and the wet-spin dry-jet fiber composition.

23. The fiber of claim 22, wherein the MOF has a $CO_2$ swing capacity of greater than 2 mmol $CO_2$/g.

24. The fiber of claim 22, wherein the MOF has a $CO_2$ swing capacity of greater than 5 mmol $CO_2$/g.

25. The fiber of claim 22, wherein the MOF has a $CO_2$ swing capacity of greater than 6 mmol $CO_2$/g.

* * * * *